United States Patent
Mohandes et al.

(10) Patent No.: US 12,494,740 B1
(45) Date of Patent: Dec. 9, 2025

(54) METHOD AND SYSTEM FOR DETECTING DEFECTS IN SOLAR PANELS

(71) Applicants: King Fahd University of Petroleum and Minerals, Dhahran (SA); Saudi Data and Artificial Intelligence Authority (SDAIA), Riyadh (SA)

(72) Inventors: Mohamed Mohandes, Dhahran (SA); Hambal Tella, Dhahran (SA); Bo Liu, Dhahran (SA); Ali Al-Shaikhi, Dhahran (SA); Shafiqur Rehman, Dhahran (SA)

(73) Assignees: King Fahd University of Petroleum and Minerals, Dhahran (SA); Saudi Data and Artificial Intelligence Authority (SDAIA), Riyadh (SA)

(*) Notice: Subject to any disclaimer, the term of this patent is extended or adjusted under 35 U.S.C. 154(b) by 0 days.

(21) Appl. No.: 19/241,050

(22) Filed: Jun. 17, 2025

(51) Int. Cl.
H02S 50/15 (2014.01)
G06T 7/00 (2017.01)

(52) U.S. Cl.
CPC ............ H02S 50/15 (2014.12); G06T 7/0004 (2013.01); G06T 2207/10032 (2013.01); G06T 2207/10048 (2013.01); G06T 2207/20081 (2013.01); G06T 2207/20084 (2013.01)

(58) Field of Classification Search
CPC .................. H02S 50/15; G06T 7/0004; G06T 2207/10032; G06T 2207/10048; G06T 2207/20081; G06T 2207/20084
See application file for complete search history.

(56) References Cited

FOREIGN PATENT DOCUMENTS

| | | | |
|---|---|---|---|
| CN | 113538391 A | 10/2021 | |
| WO | WO-2023031843 A1 * | 3/2023 | ........... G06T 7/0002 |

OTHER PUBLICATIONS

Wang Yin et al., "PV-YOLO: Lightweight YOLO For Photovoltaic Panel Default Detection", IEEE Journals & Magazines, vol. 11, Jan. 30, 2023, pp. 10966-10976, 19 pages.
YOLOS Object Detection Model: What is, How to Use, GitHub, Jun. 1, 2021, Excerpts only, 4 pages.

* cited by examiner

Primary Examiner — Jamil Ahmed
(74) Attorney, Agent, or Firm — Oblon, McClelland, Maier & Neustadt, L.L.P.

(57) ABSTRACT

A method and a system for detecting defects in solar panels. The method includes collecting an image dataset of infrared images of the at least one mounted and operational solar panel; applying the image dataset to a YOLOS-PV convolutional neural network; converting the image dataset to a set of patches; applying position embedding to each patch and generating a set of position embedded patches; applying the set of position embedded patches to a transformer block encoder; generating a set of detection tokens; applying the set of detection tokens to an array of multi-layer perceptron (MLP) heads; classifying defects in the position embedded patches; setting, by the MLP heads, a plurality of Bpred bounding boxes for each of the set of position embedded patches; and identifying a solar panel in need of repair based on the defects in the set of position embedded patches and the plurality of Bpred bounding boxes.

20 Claims, 22 Drawing Sheets

METHOD AND SYSTEM FOR DETECTING DEFECTS IN SOLAR PANELS

BACKGROUND

Technical Field

The present disclosure is directed to Artificial Intelligence (AI) and, more particularly, to a method and a system for detecting defects in solar panels.

STATEMENT OF PRIOR DISCLOSURE BY AN INVENTOR

Aspects of the present disclosure are described in Tella, H., et al. "A Novel Cost-Function for Transformer-based YOLO Algorithm to Detect Photovoltaic Panel Defects." FME Transactions 52.4 (2024) which is incorporated herein by reference in its entirety.

STATEMENT OF ACKNOWLEDGEMENT

The authors would like to acknowledge the support provided by the Deanship of Scientific Research (DSR) at King Fahd University of Petroleum & Minerals (KFUPM), Dhahran, Saudi Arabia, for supporting this work.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Solar power plants are composed of numerous solar panels arranged in arrays on a supportive framework. These solar panels are often installed on rooftops or building facades, where the solar panels are exposed to harsh environmental conditions. Over time, this exposure of the solar panels to harsh environmental conditions can lead to various defects such as hotspots, cracks, corrosion, broken glass, etc., which significantly impact the efficiency and lifespan of the solar panels, ultimately affecting the overall performance of the solar power plant.

Conventionally, the detection of defective solar panels has relied on human experts who conduct manual inspections. While human experts can provide reliable assessments, manual inspection is time-consuming, labor-intensive, and inefficient for large-scale solar farms where large-scale solar power plants with numerous solar panels are involved. Furthermore, conventional defect detection methods, such as thermal and electrical modeling, primarily focus on analyzing temperature variations and power output to assess the performance of these solar panels. These conventional methods often fail to identify all types of defects, particularly microcracks or early-stage hotspots, which can worsen over time and reduce the overall performance of these solar power plants.

To overcome the above-discussed limitations of conventional inspection and diagnostic techniques, advanced and non-destructive imaging techniques have been proposed for defect detection in solar panels. These techniques include Electroluminescence (EL), Infrared Thermography (IRT), Lock-in Thermography (LIT), Ultraviolet (UV), Magnetic Field Imaging (MFI), and Spectroscopic Diagnostic Techniques (SDT). Additionally, signal processing techniques such as wavelet transform and Fast Fourier Transform (FFT) have been applied to enhance defect detection in solar panels. Each of these imaging techniques offers enhanced visibility of different types of defects, such as temperature distribution for hotspots or structural issues like cracks. However, these existing imaging techniques still have constraints in terms of automation and accuracy.

Despite their effectiveness in certain cases, these existing techniques have notable drawbacks. Manual inspections are slow and inconsistent, thermal and electrical modeling is affected by environmental conditions and fails to detect structural defects, and imaging-based techniques often require specialized equipment and controlled conditions. Similarly, the signal processing techniques involve high computational costs and lack generalization across different defect types. These limitations highlight the need for a more efficient, automated, and accurate approach to enhance the defect detection process in solar panels.

SUMMARY

In an exemplary embodiment, a method for detecting defects in solar panels is disclosed. The method includes collecting, by a thermal camera on at least one imaging drone navigating over at least one mounted and operational solar panel, an image dataset of infrared images of the at least one mounted and operational solar panel. The method includes applying the image dataset to a You Only Look One Series—Photovoltaic (YOLOS-PV) convolutional neural network including a pretrained vision transformer. The method includes converting, by the pretrained vision transformer, the image dataset to a set of patches representing defined portions of the image dataset. The method includes applying, by a sequential position embedder, position embedding to each patch of the set of patches and generating a set of position embedded patches. The method includes applying the set of position embedded patches to a transformer block encoder. The method includes generating, by the transformer block encoder, a set of detection tokens. The method includes applying the set of detection tokens to an array of multi-layer perceptron (MLP) heads. The method includes classifying, by the MLP heads, defects in the set of position embedded patches. The method includes setting, by the MLP heads, a plurality of Bpred bounding boxes for each of the set of position embedded patches. The method includes identifying, by a computer system having circuitry with program instructions including the YOLOS-PV convolutional neural network, and at least one processor configured to execute the YOLOS-PV convolutional neural network, a solar panel in need of repair based on the defects in the set of position embedded patches and the plurality of Bpred bounding boxes. The identifying includes calculating a weighted loss combination comprising a first weight of 0.750 applied to a generalized intersection over union (GIoU) loss and a second weight of 0.250 applied to an L1 regression loss for the plurality of Bpred bounding boxes.

In another exemplary embodiment, a system for solar panels defects detection is disclosed. The system includes at least one imaging drone equipped with a thermal camera configured to collect infrared images of at least one mounted and operational solar panel. The system includes a computer system having circuitry, memory storing program instructions, and at least one processor configured to receive an image dataset of infrared images from the at least one imaging drone. The at least one processor is further configured to process the image dataset using a You Only Look One Series—Photovoltaic (YOLOS-PV) convolutional neural network comprising a pretrained vision transformer. The at least one processor is further configured to convert the image dataset to a set of patches. The at least one processor is further configured to apply position embedding to each patch. The at least one processor is further configured to generate a set of detection tokens using a transformer block encoder. The at least one processor is further configured to classify defects and a plurality of Bpred bounding boxes for the defects using an array of multi-layer perceptron (MLP) heads. The at least one processor is further configured to determine which solar panel needs repair based on a weighted loss combination comprising a first weight of 0.750 applied to a generalized intersection over union (GIoU) loss and a second weight of 0.250 applied to an L1 regression loss for the plurality of Bpred bounding boxes. The weighted loss combination resolves overlapping Bpred bounding boxes for different object classes.

In another exemplary embodiment, a non-transitory computer readable medium having instructions stored therein that, when executed by one or more processor, cause the one or more processors to perform a method for detecting defects in solar panels. The method includes receiving an image dataset of infrared images of at least one mounted and operational solar panel. The method includes applying the image dataset to a You Only Look One Series—Photovoltaic (YOLOS-PV) convolutional neural network. The method includes converting the image dataset to a set of patches. The method includes applying position embedding to each patch. The method includes generating a set of detection tokens. The method includes classifying defects and a plurality Bpred bounding boxes for the defects. The method includes calculating a generalized intersection over union (GIoU) loss between the plurality of Bpred bounding boxes and ground-truth bounding boxes (Bgt). The GIoU loss accounts for non-overlapping bounding boxes by incorporating a penalty based on a size of an enclosing box containing both Bpred and Bgt bounding boxes. The method includes calculating an L1 regression loss between coordinates of the Bpred and Bgt bounding boxes. The method includes applying a weighted loss combination of the GIoU loss and the L1 regression loss. A weight of 0.750 is applied to the GIoU loss and a weight of 0.250 is applied to the L1 regression loss. The method includes determining which solar panel needs repair based on the classification and the weighted loss combination.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
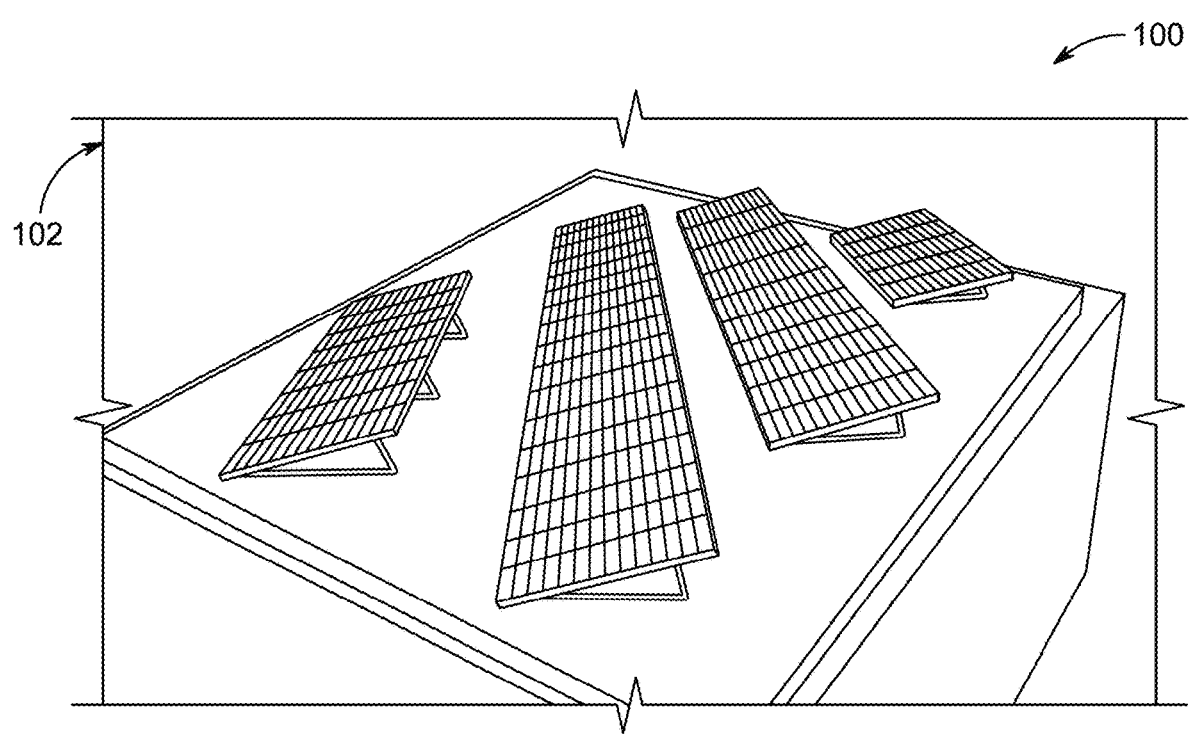
FIG. 1 is an exemplary diagram depicting a grayscale version of Red Green Blue (RGB) image of solar panels, according to certain embodiments.

In the drawings, like reference numerals designate identical or corresponding parts throughout the several views. Further, as used herein, the words "a," "an," and "and the like" generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for detecting defects in solar panels. In order to detect defects in the solar panels, initially, an image dataset of infrared images of at least one mounted and operational solar panel is collected. The image data is collected using a thermal camera on at least one imaging drone navigating over the at least one mounted and operational solar panel. Further, the image dataset is applied to a You Only Look One Series—Photovoltaic (YOLOS-PV) convolutional neural network, including a pretrained vision transformer. Once the image dataset is applied, the pretrained vision transformer is configured to convert the image dataset to a set of patches representing defined portions of the image dataset. Based on the conversion, position embedding is applied to each patch of the set of patches using a sequential position embedder. Further, the sequential position embedder generates a set of position embedded patches. Further, the set of position embedded patches is applied to a transformer block encoder. The sequential position embedder processes the spatially divided image patches in a temporally ordered manner, assigning positional encodings to each patch to preserve their layout across the photovoltaic panel. This encoding allows the transformer model to learn spatial relationships between neighboring patches, enabling it to detect extended or non-local defect patterns.

Upon applying the set of position embedded patches, a set of detection tokens is generated using the transformer block encoder. Further, the set of detection tokens is applied to an array of multi-layer perceptron (MLP) heads. The array of MLP heads is then configured to classify defects in the position embedded patches. Upon classifying the defects, the MLP heads are configured to set a plurality of Bpred bounding boxes for each of the set of position embedded patches. Further, a solar panel in need of repair is identified based on the defects in the set of position embedded patches and the plurality of Bpred bounding boxes.

Referring now to FIG. 1, the present disclosure provides an exemplary diagram 100 depicting a grayscale version of a Red Green Blue (RGB) image 102 (hereinafter referred to as 'the image') of solar panels, according to certain embodiments. The image 102 in FIG. 1, represents a set of four solar panels installed on a building rooftop. The image 102 is used for evaluating effectiveness of a You Only Look One Series for Photovoltaic systems (YOLOS-PV) convolutional neural network in detecting solar panel defects. In an embodiment, the image 102 shows the set of four solar panels for ease of explanation. The rooftop may include multiple solar panels, some of which exhibit defects that are detectable through the YOLOS-PV convolutional neural network. Further, multiple RGB images can be taken to cover the presence of all solar panels in a predefined area (e.g., an area associated with a farm). Initially, at least one imaging drone equipped with a thermal camera is deployed to capture thermal video footage of the solar panels. In particular, the thermal camera is configured to collect an image dataset of infrared images of the solar panels. The solar panels may be mounted, and operational solar panels. Examples of the at least one imaging drone may include, but are not limited to, a DaJiang Innovations (DJI) Matrice 300 Real-Time Kinematics (RTK), a DJI Mavic 3T, a Parrot Anafi, and a nAutel EVO II Dual 640T. Further, examples of the thermal camera may include a Forward-Looking InfraRed (FLIR) Vue Pro Radiometric (R) camera, a DJI Zenmuse Hybrid and Thermal imaging sensor (H20T) camera, a Workswell InfraRed Imaging System (WIRIS) pro, and the like.

The image dataset of the infrared images is then processed in real-time using the YOLOS-PV convolutional neural network, which employs a transformer-based architecture (e.g., a pretrained vision transformer) with optimized loss function weights to enhance defect localization. In an embodiment, the transformer-based architecture in the YOLOS-PV convolutional neural network uses self-attention mechanisms to capture global context and spatial relationships in infrared images (also referred to as solar thermal images). This improves defect localization by enhancing feature extraction and reducing errors in detecting defects in the solar panels. Table 1 below represents a type of defect in a solar panel along with the cause of each defect.

TABLE 1

| Defect Type | Causes |
| --- | --- |
| Hotspot | Extreme Temperature |
| Broken glass | Hail or collisions |
| Dust Build up | Strong wind or dust accumulation |
| Cracked back sheets | Collision or other harsh environmental conditions |
| Ribbon Discoloration | Corrosion, heat, or moisture exposure |
| Encapsulant Discoloration | UV light exposure, high temperature, and humidity |
| Delamination | Manufacturing, installation issues, environmental conditions etc. |
| Bubbles | Inadequate heating and moisture, or contaminants |
| Defective Junction box | Faulty connections |
| Poor String Connection | Inadequate soldering, mechanical damage, or the presence of debris |
| Potential Induced Degradation (PID) | Exposure to high temperatures and humidity |
| Corrosion | Moisture or humidity and extreme temperature |
| Soiling | Accumulation of dirt, dust, or other materials |
| Diode Defects | Installation and functioning of bypass diodes |

In the Table 1, each column of a first row, 'defect types' depicts the type of defect identified in the solar panels. For example, the type of defects include a hotspot, a broken glass, dust buildup, a corrosion, a soiling, etc. Further, each column of a second row, 'causes', represents a cause due to which each type of defect occurs in the solar panels. For example, the cause for the defect may include extreme temperature, hail or collisions, strong wind or dust accumulation, moisture or humidity, and extreme temperature, and the like. By way of an example, a diode defect may occur within the solar panels due to the installation and functioning of bypass diodes.

In an embodiment, the image dataset captured using the thermal camera is used to accurately identify and classify defective solar panels using the YOLOS-PV convolutional neural network's ability. The disclosed YOLOS-PV convolutional neural network demonstrated improved performance over conventional YOLO model variants by prioritizing localized defects and leveraging transformer attention mechanisms.

Figure 2:
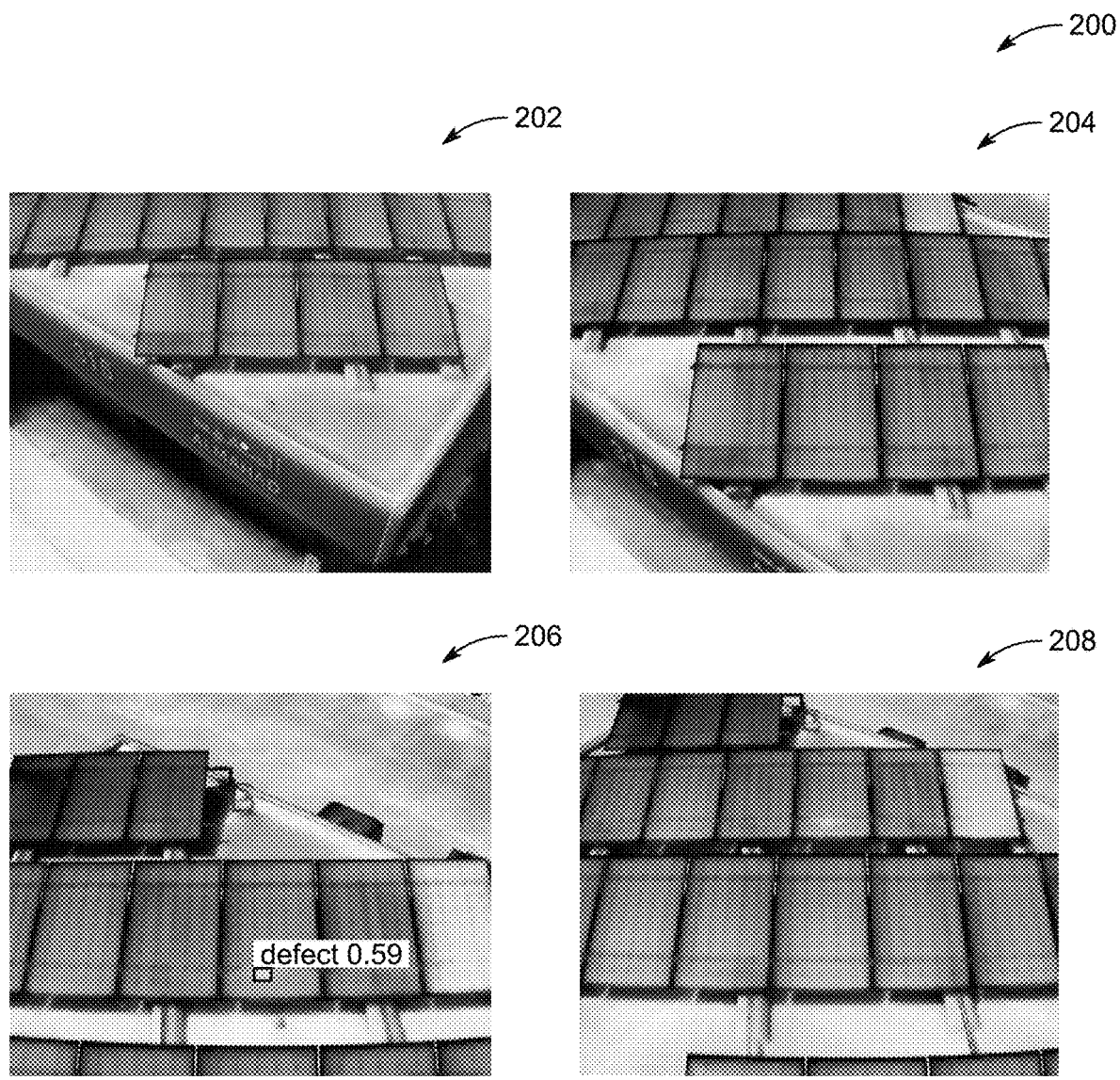
FIG. 2 is an exemplary diagram representing four snapshots of a video captured using a thermal camera, according to certain embodiments.

In particular, solar panel defect detection is crucial for ensuring optimal energy efficiency and longevity of the solar panels. A survey of existing YOLO model variants for defect detection in the solar panels revealed that RGB images are not well-suited for identifying defects due to their limited visibility of thermal anomalies. To overcome this limitation of the existing YOLO model variants, non-destructive detection techniques such as Infrared Thermography (IRT) and Lock-in Thermography (LIT) are applied before an object (i.e., a defect) detection process. These non-destructive detection techniques enhance defect visibility and localization by capturing thermal variations, thereby facilitating more accurate detection and classification of the defects in the solar panels. In particular, IRT is a non-invasive imaging technique that utilizes infrared radiation to generate infrared images (also referred to as thermal images, or solar thermal images), depicting temperature distribution across the solar panels. FIG. 2 illustrates examples of the infrared images used in defect detection.

Previous research has explored various object detection models for solar panel inspection. For instance, a YOLO version three (YOLOv3) has been applied to both infrared and RGB image datasets collected via drones (i.e., the at least one imaging drone), achieving a mean Average Precision (mAP@0.5) of 0.70 with a 74% confidence level for hotspot defect detection in the solar panels. Additionally, Transformer Prediction Heads (TPH)-YOLOv5, which integrates TPH into the YOLOv5 framework, has been used for drone-based RGB image datasets, achieving an average precision of approximately 39%. Further, faster Region-Based Convolutional Neural Network (RCNN) models incorporating edge detection algorithms were applied to localize hotspot defects on infrared images, achieving a mAP of 0.67. Furthermore, an enhanced YOLOv5 model, termed AP-YOLOv5, improved anchor boxes and prediction heads, yielding a mAP of 0.87, an average recall (AR) of 89%, and an F1 score of 88.90% on the infrared images.

Despite these advancements, the conventional YOLO model variants still present limitations in detection accuracy and defect localization. To address these gaps in the exiting YOLO model variants for solar panel defect detection, the performance of six YOLO model variants, i.e., a YOLO version 5 (YOLOv5), a YOLOv5 with Oriented Bounding Boxes (YOLOv5-OBB), a YOLO version 6 (YOLOv6), a YOLO version 7 (YOLOv7), a YOLO version 8 (YOLOv8), and a YOLOS were evaluated. Further, based on the evaluation, a novel YOLO model, i.e., the YOLOS-PV convolution neural network (i.e., a model disclosed in the present disclosure) is developed. The YOLOS-PV convolution neural network enhances the transformer-based architecture with optimized loss function weights for improved localization of solar panel defects. The YOLOS-PV convolution neural network outperforms the existing YOLO model variants, demonstrating superior defect detection accuracy and robustness in thermal imaging applications. A Table 2 below represents a summary of all existing YOLO model variants.

TABLE 2

| Model(s) | Dataset(s) | Results |
| --- | --- | --- |
| Yolov3 | Infra-Red and Visible imaging by Drone (Unavailable) | 0.70 (mAP@0.5) |
| Yolov3 | Thermal images (Unavailable) | 74.00% (Accuracy) |
| TPH-YOLOv5 | VisDrone2021, DET-test-challenge dataset (Available) | 39.18% (AP) for DET-test-challenge and 39.43% (AP) for VisDrone2021 |
| Faster RCNN | IR thermal Image (Unavailable) | 0.67 (mAP) |
| YOLOv5 | IR thermal Image (Unavailable) | 87.80% (mAP), 89.00% (AR) and 88.90% (F1 Score) |

In Table 2, each row of a first column 'model' represents a name of a variant of a YOLO model variant. Each row of a second column 'dataset' represents a dataset used to analyze each YOLO model variant for detecting defects in the solar panels. Each row of a third column 'results' accuracy and robustness of each YOLO model variant in detecting the defects in the solar panels.

Referring now to FIG. 2, the present disclosure provides an exemplary diagram 200 representing four snapshots of a video captured using a thermal camera, according to certain embodiments. In particular, FIG. 2 represents a set of four infrared images, i.e., an image 202, an image 204, an image 206, and an image 208. Each of the set of four infrared images were captured using the thermal camera on the at least one imaging drone when the at least one drone flew over an array of the solar panels. For instance, the image 202 captures an aerial thermal view of a solar panel array, showcasing temperature variations across the solar panels. The image 204 provides a closer view, focusing on individual solar panel and their distinct heat signatures for defect detection analysis. The image 206 demonstrates a defect (labeled as defect 0.59) detected in a solar panel using the YOLOS-PV convolution neural network, showcasing the capability of the YOLOS-PV convolution neural network in identifying defects in real-time. Further, the image 208 highlights the temperature distribution across solar panels more prominently.

Figure 3:
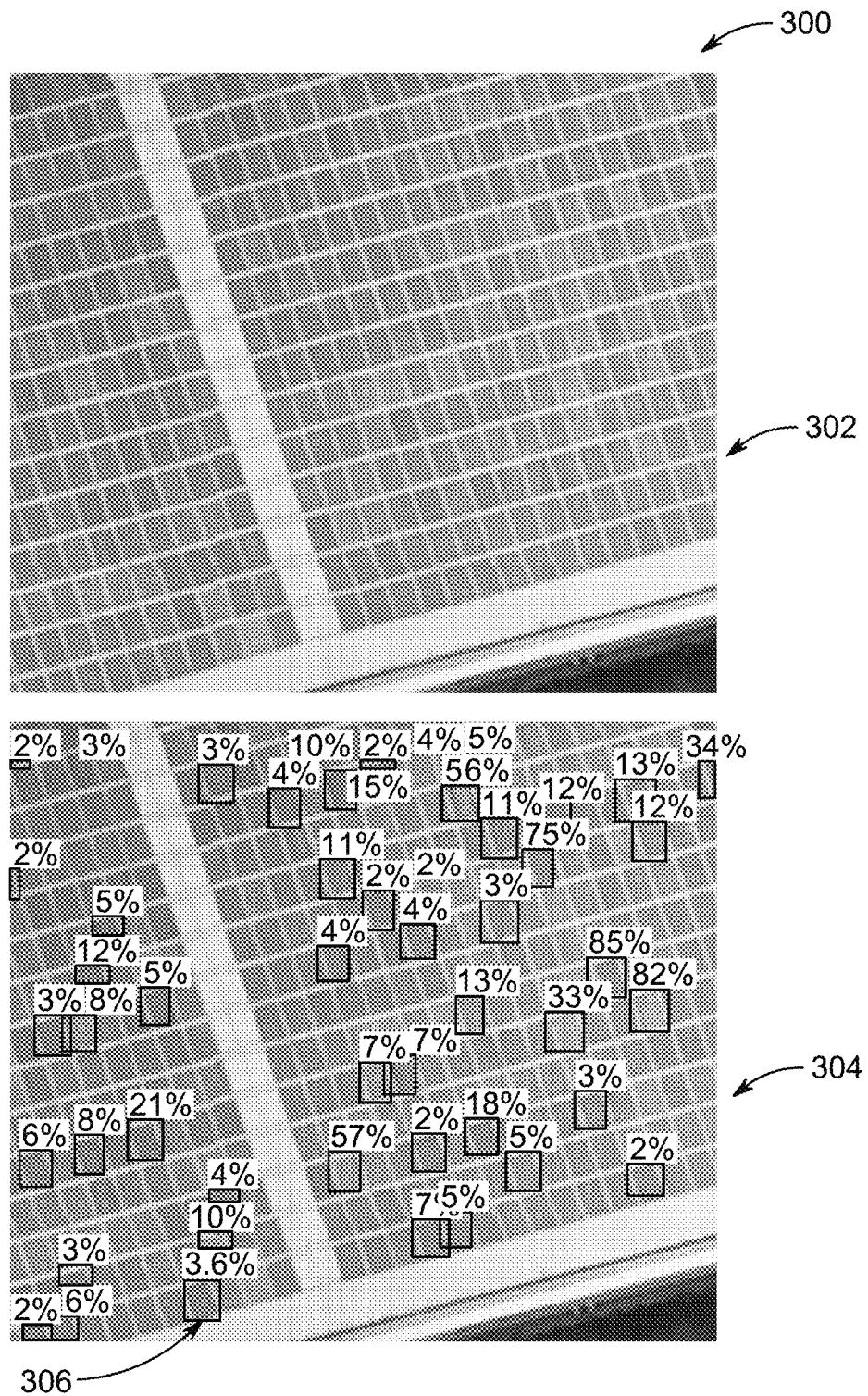
FIG. 3 is an exemplary diagram representing defect detection on RGB images associated with a solar panel, according to certain embodiments.

Referring now to FIG. 3, the present disclosure provides an exemplary diagram 300 representing defects detection on RGB images associated with a solar panel, according to certain embodiments. Although, FIG. 3 shows grayscale images of RGB, for all practical purposes, the RGB images are used for detecting and representing defects. In particular, FIG. 3 illustrates the limitations of using RGB images for solar panel defect detection. An image 302 presents an original RGB image of a solar panel array where no apparent defects are visible to the naked eye. Further, an image 304 demonstrates the results of defect detection on the original RGB image, revealing a high number of false defect detections, as indicated by numerous highlighted regions, e.g., a highlighted region 306. These false positives misclassify functional solar panels as defective, emphasizing the challenges associated with defect detection using the RGB images. Therefore, there is a need of using the image dataset of infrared images, which provides more reliable defect localization by capturing temperature variations in the solar panels.

In other words, to develop and train highly effective deep learning (DL) models (i.e., the YOLOS-PV convolution neural network) for solar panel defect detection, the availability of a comprehensive and well-structured dataset is essential. In order to develop and train the YOLOS-PV convolution neural network, solar thermal image datasets, i.e., the image dataset of infrared images, are used due to their enhanced defect visibility and reduced misclassification rates. This decision to prioritize the usage of the image datasets of infrared images is based on the observation that defect detection in the RGB images often leads to erroneous defect classifications, incorrectly identifying functional solar panels as defective.

Figure 4:
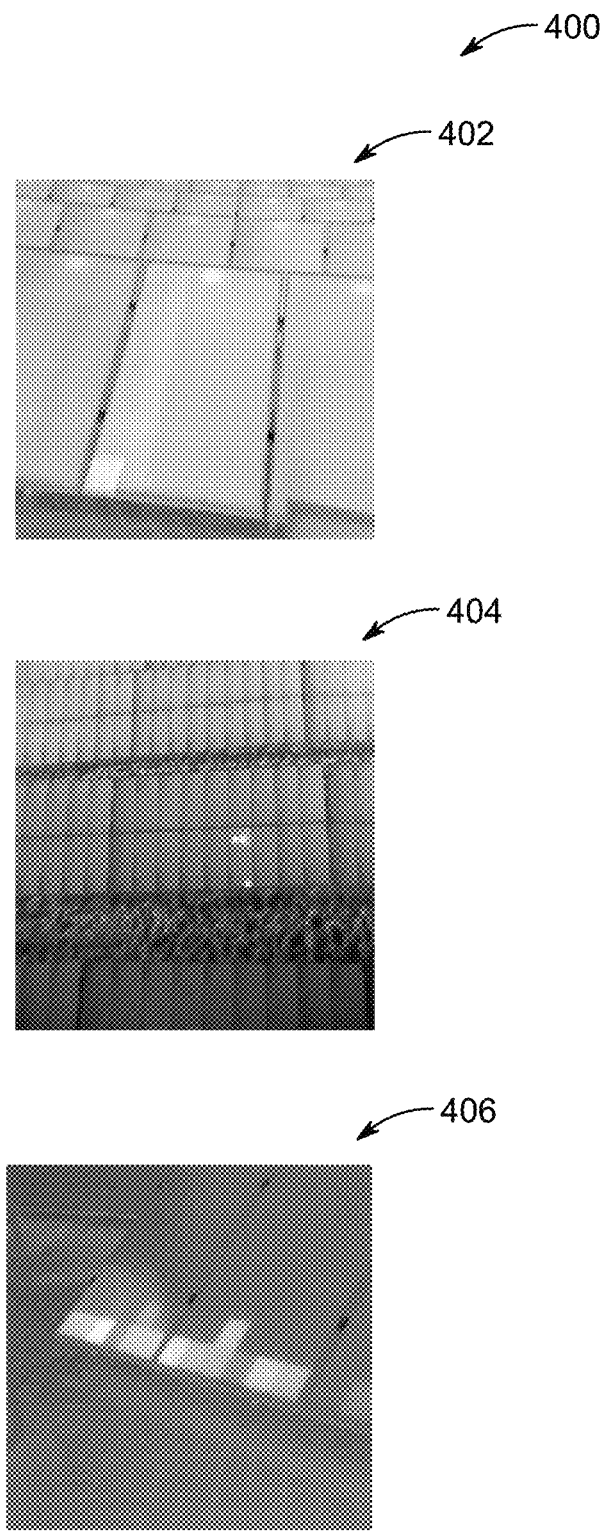
FIG. 4 is an exemplary diagram representing solar thermal images illustrating defect visibility using Infrared Thermography (IRT) techniques on a solar power plant, according to certain embodiments.

Referring now to FIG. 4, the present disclosure provides an exemplary diagram 400 representing solar thermal images illustrating defect visibility using Infrared Thermography (IRT) techniques on a solar power plant, according to certain embodiments. The solar thermal images may correspond to the infrared images present within the image dataset. In particular, to build a robust image dataset for developing and training the YOLOS-PV convolution neural network, a total of 1,056 high-resolution infrared images (640×640 pixels) is acquired across diverse solar panel environments. These infrared images are captured using advanced thermal imaging cameras (also referred to as thermal cameras) to ensure precise defect detection. FIG. 2 represents a sample of three infrared images, i.e., an image 402, an image 404, and an image 406. Further, for example, each image within the image dataset is meticulously annotated with bounding boxes and defect class labels, adhering to a Common Objects in Context (COCO) object detection dataset format to standardize and optimize a training process for the YOLOS-PV convolution neural network. The infrared images (e.g., the image 402, the image 404, and the image 406) are sourced from publicly available repositories, e.g., Nanonet and Roboflow, in addition to real-world data collected from different solar plants present at diverse locations. This usage of the diverse image dataset ensures the generalizability and reliability of the YOLOS-PV convolution neural network.

Figure 5A:
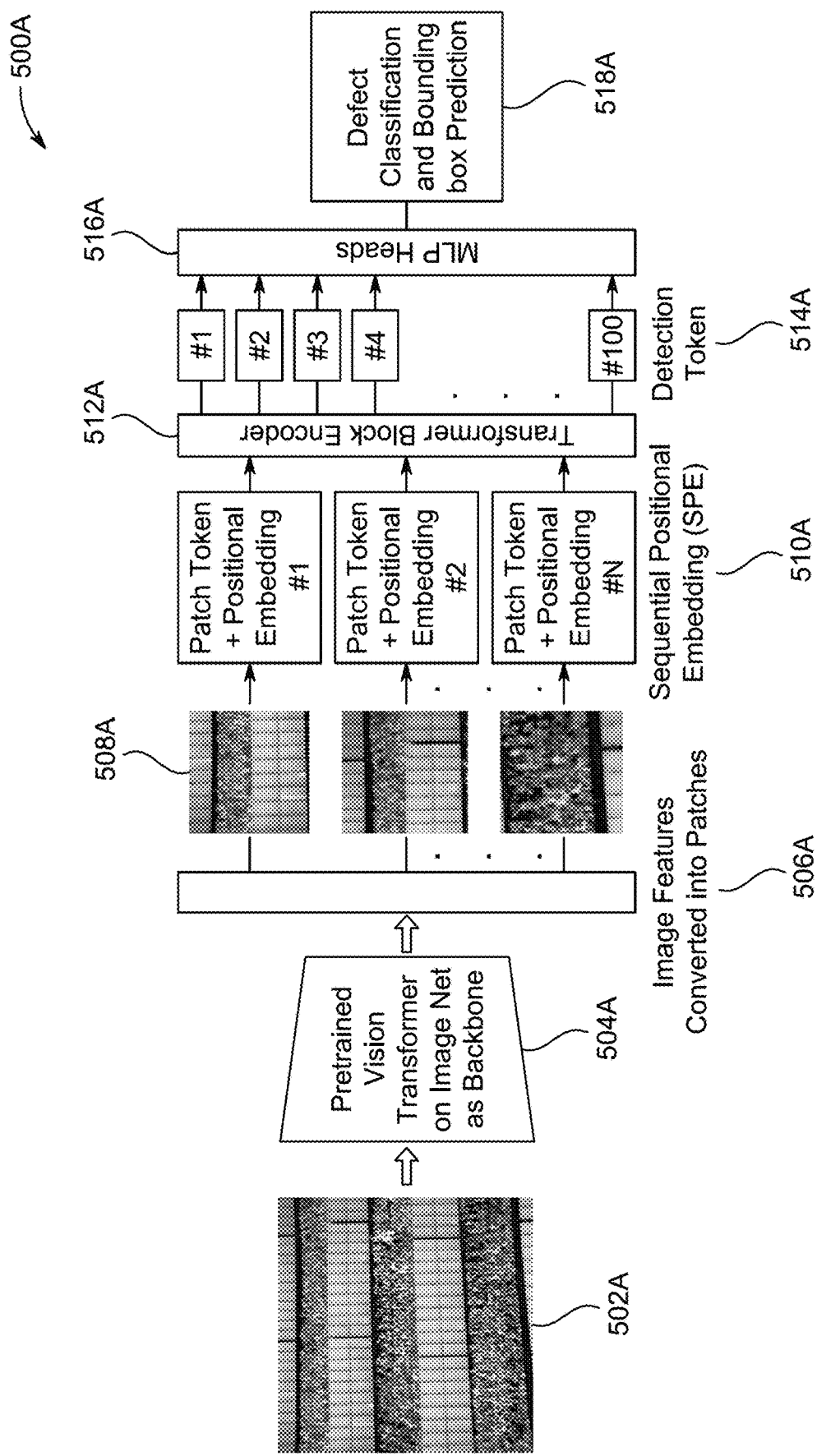
FIG. 5A is an exemplary diagram illustrating a process of detecting defects in solar panels using a convolutional neural network, according to certain embodiments.

Referring now to FIG. 5A, the present disclosure provides an exemplary diagram 500A illustrating a process of detecting defects in solar panels using a convolutional neural network, according to certain embodiments. The convolution neural network corresponds to the YOLOS-PV convolution neural network. In an embodiment, the YOLOS-PV convolution neural network (i.e., an advanced variant of YOLOS) is based on a Vision Transformer (ViT) model and uses Sequential and Positional Encoding (SPE) to improve the understanding of spatial and contextual details in an infrared image. Further, the YOLOS-PV convolution neural network uses the pretrained vision transformer (i.e., a transformer-based encoder) to better analyze relationships between different image features.

Initially, at step 502A, an infrared image of the solar panels is captured using the thermal camera on the at least one imaging drone. The infrared image highlights temperature variations, allowing defect detection by identifying abnormal heat patterns. Once the infrared image is captured, at step 504A, the infrared image is provided as an input to the pretrained vision transformer. In an embodiment, the pretrained vision transformer is trained on ImageNet, i.e., a large dataset including millions of labeled images used for training deep learning models. The pretrained vision transformer acts as a backbone of the YOLOS-PV convolution neural network. The pretrained vision transformer processes each infrared image by breaking them into smaller fixed-size patches and then learns relationships between these fixed-size patches using a transformer block encoder. The pretrained vision transformer is used to extract meaningful image features from the infrared image. The image features may include low-level features (e.g., edges, color, corners), mid-level features (e.g., objects shape and parts, repeating patterns, etc.), and high-level features (e.g., object semantics, spatial relationships, defects, etc.).

Further, at step 506A, the image features extracted by the pretrained vision transformer from the infrared image is converted into a set of patches as depicted via step 508A (i.e., smaller fixed-size patches). Each patch acts as an individual input unit, making it easier for the YOLOS-PV convolution neural network to process the infrared image 502A in segments rather than as a whole image. Further, at step 510A, each patch of the set of patches is assigned a unique patch token along with a positional embedding. In other words, the position embedding is applied to each patch of the set of patches and a set of position embedded patches are generated. In an embodiment, the positional embedding provides spatial information, ensuring that the YOLOS-PV convolution neural network understands the arrangement of different patches in the infrared image.

At step 512A, each of the set of patches is passed through the transformer block encoder where self-attention mechanisms allow the YOLOS-PV convolution neural network to capture relationships between different regions of the infrared image. The transformer block encoder is composed of multiple SPE layers, encodes both spatial and sequential information, which enhances the YOLOS-PV convolution neural network's ability to capture global feature dependencies. Upon passing each patch through the transformer block encoder, at step 514A, a set of detection tokens is generated. The set of detection tokens represents different defects (also referred to as objects) identified in the infrared image. Once the set of detection tokens are generated, at step 516A, the set of detection tokens are processed by an array of Multi-Layer Perceptron (MLP) heads. The MLP heads are used to classify defects in the set of position embedded patches. In other words, the MLP heads predict the defect (e.g., hotspot, crack, dirt) and predict a bounding box (i.e., the predicted (Bpred) bounding box,) to highlight a location of each detected defect in the solar panel. In an embodiment, the predicted bounding box is also referred to as a Bpred bounding box. In other words, the MLP heads integrate learned features to generate defect classification outputs and corresponding bounding box predictions. Further, at step 518A, a resultant infrared image with defects highlighted using a plurality of Bpred bounding boxes and corresponding classification labels are provided as an output. In particular, the YOLOS-PV convolution neural network helps to accurately identify faulty solar panels for maintenance and efficiency improvement.

Figure 5B:
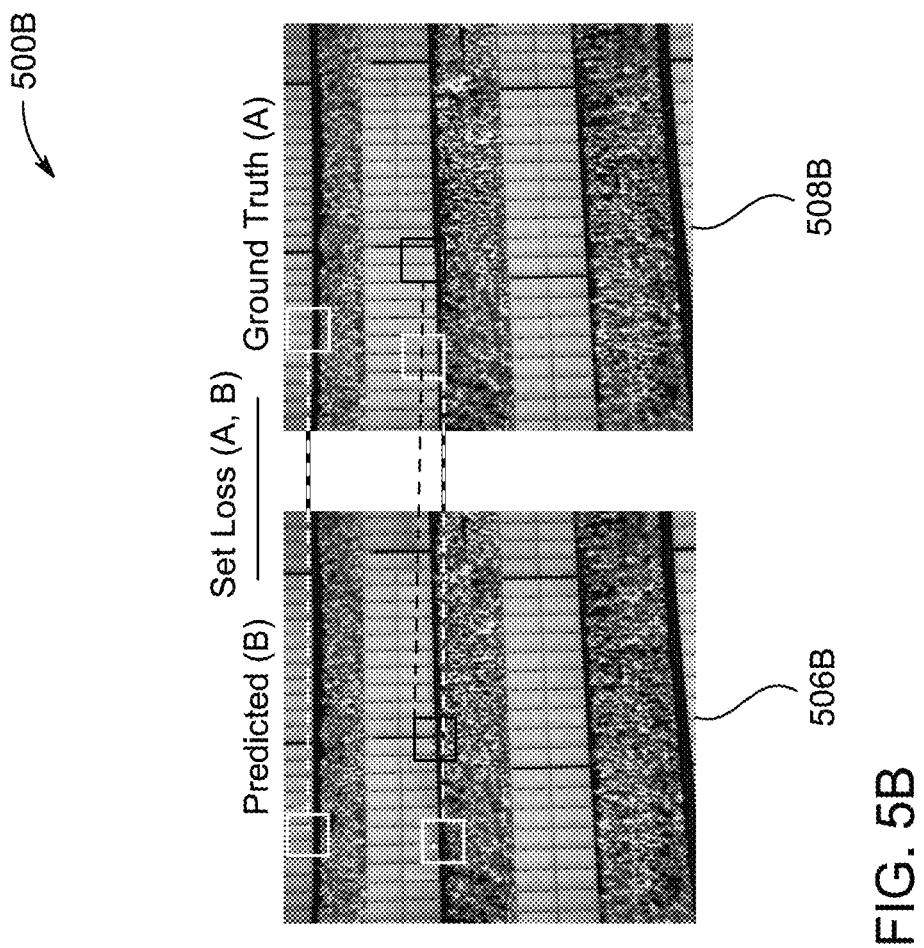
FIG. 5B is an exemplary diagram illustrating a bounding box prediction process of the convolutional neural network, according to certain embodiments.

Referring now to FIG. 5B, the present disclosure provides an exemplary diagram 500B illustrating a bounding box prediction process of the convolutional neural network, according to certain embodiments. FIG. 5B is explained in conjunction with FIG. 5A.

In an embodiment, the convolution neural network model may correspond to the YOLOS-PV convolutional neural network. In particular, FIG. 5B represents a defect detection process in the solar panels using a bounding box-based object detection approach with a bipartite matching process. Initially, at step 502B, a set of predicted (Bpred) bounding boxes (e.g., four bounding boxes) representing locations of defects detected in the solar panels are processed using the bipartite matching process as depicted via step 504B. Each of the set of Bpred bounding boxes is represented via a different color (depicted via different shades of grey color). Further, each Bpred bounding box is defined by a set of coordinates, i.e., center coordinates (x, y) and dimensions (width w and height h). Further, at step 504B, the bipartite matching process is applied on each of the set of Bpred bounding boxes and an actual ground truth defect associated with the solar panels. Based on the bipartite matching process, if no match is found for a Bpred bounding box of the set of Bpred bounding boxes, it is considered a false detection. Further, at step 506B a left image (i.e., predicted (B)) showing detected bounding boxes from the YOLOS-PV convolutional neural network is represented. Further, at step 508B, a right image (i.e., ground truth (A)) containing actual defect locations annotated by experts (e.g., solar energy engineers, thermal imaging specialists, etc.) is represented. Further, differences between the left image and the right image are computed using a set loss function (i.e., an L1 loss), which measures errors in prediction. In other words, the L1 loss is computed between the set of coordinates of each Bpred bounding box and a set of ground-truth bounding box coordinates (xi0, yi0, wi0, hi0). The L1 loss is calculated based on how well the set of Bpred bounding boxes in the left image aligns with the actual ground truth defects in the right image. Further, a reward point is given to the YOLOS-PV convolutional neural network for each correct prediction, and a penalty point is applied to the YOLOS-PV convolutional neural network for each incorrect prediction.

In particular, to refine the accuracy of defect detection in the solar panels, the YOLOS-PV convolutional neural network employs the bipartite matching process, similar to a Detection Transformer (DETR) framework, to align each Bpred bounding box with a corresponding ground truth defect. Further, the YOLOS-PV convolutional neural network's optimization is governed by a composite loss function, i.e., L1 loss (depicted as $\mathcal{L}_{YOLOS}$) which is calculated using an equation 1.

$$\mathcal{L}_{YOLOS} = \lambda_{loc}\mathcal{L}_{loc} + \lambda_{obj}\mathcal{L}_{obj} + \lambda_{cls}\mathcal{L}_{cls} \qquad (1)$$

In equation 1, '$\lambda_{loc}$', '$\lambda_{obj}$', and '$\lambda_{cls}$' are weights assigned to a localization loss, an objectness loss, and a classification loss, respectively. Further, '$\mathcal{L}_{loc}$' is used to quantify an error in Bpred bounding box locations. '$\mathcal{L}_{obj}$' is used to evaluate an accuracy of an objectness score (i.e., whether a defect is detected or not). '$\mathcal{L}_{cls}$' is used to measure a classification error of the detected defect. The L1 loss ensures precise defect localization while minimizing false detections, enhancing the YOLOS-PV convolutional neural network robustness in solar panel defect detection process.

Figure 6A:
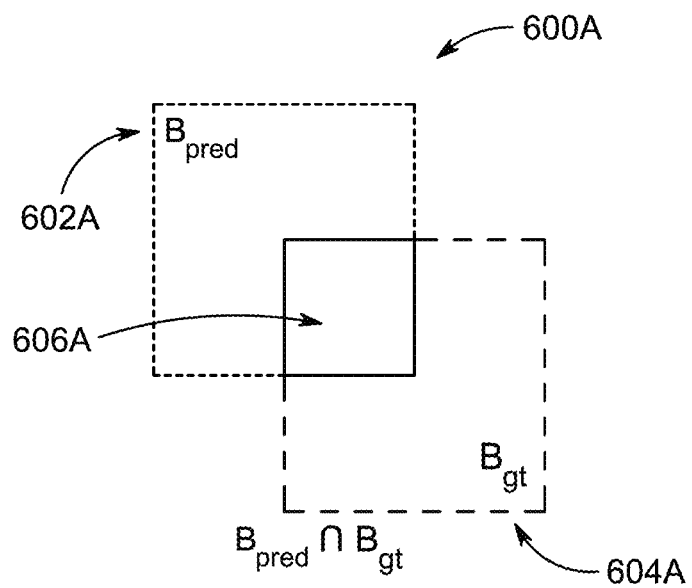
FIG. 6A is an exemplary diagram illustrating an overlapping scenario between a predicted bounding box and a ground truth bounding box, according to certain embodiments.

Referring now to FIG. 6A, the present disclosure provides an exemplary diagram 600A illustrating an overlapping scenario between a predicted bounding box (i.e., a Bpred bounding box 602A) and a ground truth bounding box (Bgt) 604A, according to certain embodiments. In particular, FIG. 6A represents an intersection (i.e., an overlap) between the Bpred bounding box 602A and the ground truth bounding box (Bgt) 604A. A small line dashed box represents the Bpred bounding box 602A and a large line dashed box represents the ground truth bounding box (Bgt) 604A. Further, a solid line region 606A formed between the Bpred bounding box 602A and the ground truth bounding box (Bgt) 604A represents the intersection (Bpred A Bgt), which is an overlapping area between the Bpred bounding box 602A and the ground truth bounding box (Bgt) 604A.

Figure 6B:
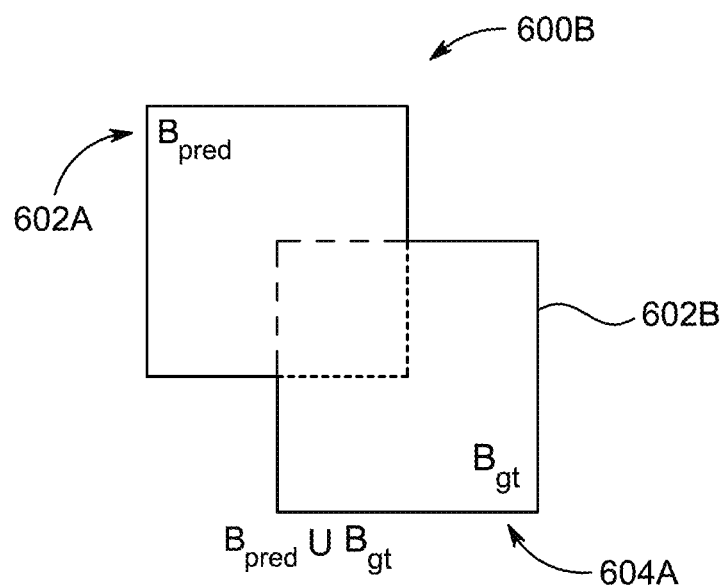
FIG. 6B is an exemplary diagram illustrating a union scenario showing a combined area covered the predicted bounding box and the ground truth bounding box, according to certain embodiments.

Referring now to FIG. 6B, the present disclosure provides an exemplary diagram 600B illustrating a union scenario showing a combined area covered by a predicted bounding box (i.e., a Bpred bounding box) and a ground truth bounding box (Bgt), according to certain embodiments. FIG. 6B is explained in conjunction with FIG. 6A. The Bpred bounding box and the ground truth bounding box (Bgt) may correspond to the Bpred bounding box 602A and the ground truth bounding box (Bgt) 604A, respectively. In particular, FIG. 6B represents a union (Bpred U Bgt) of the Bpred bounding box 602A and the ground truth bounding box (Bgt) 604A, which includes an entire area covered by the Bpred bounding box 602A and the ground truth bounding box (Bgt) 604A. A black solid line box 602B formed by the Bpred bounding box 602A and the ground truth bounding box (Bgt) 604A represents the union (Bpred U Bgt) of the Bpred bounding box 602A and the ground truth bounding box (Bgt) 604A.

In an embodiment, the Intersection over Union (IoU) loss is a widely used metric to quantify a dissimilarity between two bounding boxes, i.e., the Bpred bounding box 602A and the ground truth bounding box (Bgt) 604A. The IoU, i.e., 'IoU($B_{pred}$, Bgt)' between the Bpred bounding box 602A and the ground truth bounding box (Bgt) 604A is calculated using an equation 2.

$$IoU(B_{pred}, B_{gt}) = \frac{B_{pred} \cap B_{gt}}{B_{pred} \cup B_{gt}} \qquad (2)$$

In equation 2, '$B_{pred} \cap B_{gt}$' represents the intersection (i.e., the overlapping area) of the Bpred bounding box 602A and the ground truth bounding box (Bgt) 604A as depicted via the solid line region 606A in FIG. 6A. '$B_{pred} \cap B_{gt}$' the union of the Bpred bounding box 602A and the ground truth bounding box (Bgt) 604A as depicted via the outer black solid line box 602B in FIG. 6B. Further, in scenarios with no intersection (zero overlap), the IoU becomes zero, making it ineffective for non-overlapping predictions. For this reason, the GIoU loss is introduced to cover a scenario where the Bpred bounding box 602A and the ground truth bounding box (Bgt) do not overlap. This is further explained in FIG. 7.

Figure 7:
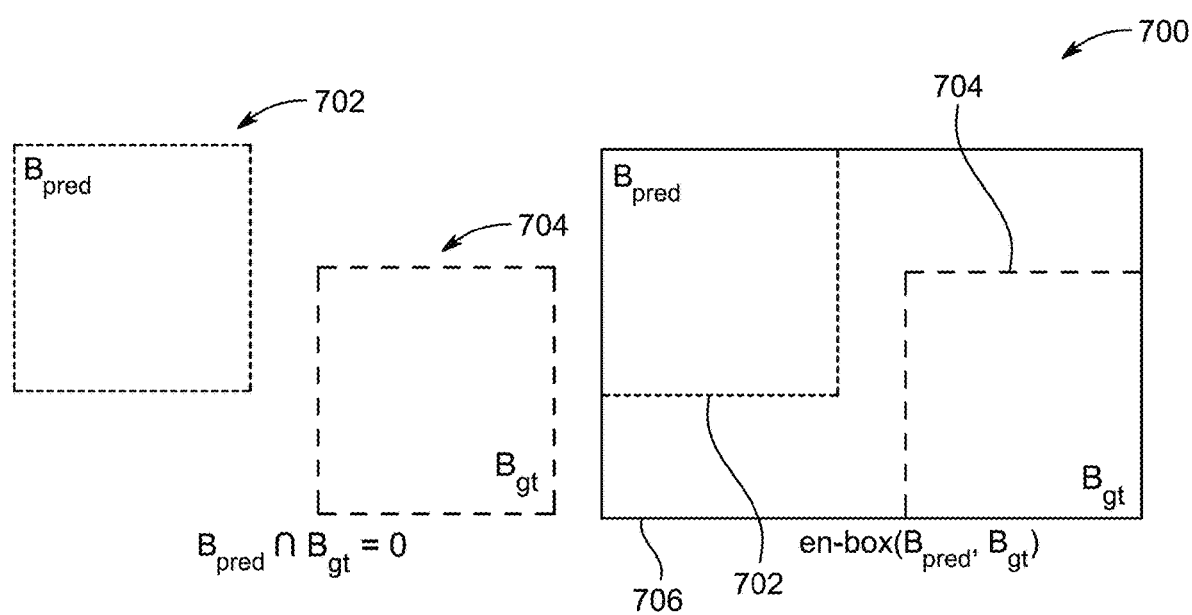
FIG. 7 is an exemplary diagram illustrating a generalized intersection over union (GIoU) loss calculation, highlighting an overlapping region, a union region, and an enclosing box (en-box), according to certain embodiments.

Referring now to FIG. 7, the present disclosure provides an exemplary diagram 700 illustrating a generalized intersection over union (GIoU) loss calculation, highlighting an overlapping region, a union region, and an enclosing box (en-box), according to certain embodiments. FIG. 7 is explained in conjunction with FIGS. 6A and 6B. In particular, FIG. 7 represents a scenario where there is no intersection, i.e., zero overlap (depicted as $B_{pred} \cap B_{gt} = 0$) between a Bpred bounding box 702 (depicted via small-dashed lines) and a ground truth bounding box (Bgt) 704 (depicted via large dashed lines). In this scenario, apart from the IoU loss, the GIoU loss is calculated. In an embodiment, the Bpred bounding box 702 may correspond to the Bpred bounding box 602A. Further, the ground truth bounding box (Bgt) 704 may correspond to the ground truth bounding box (Bgt) 604A.

Further, an outer solid line box 706 represents an enclosing box (en-box(Bpred, Bgt)), which is the smallest box that fully contains both the Bpred bounding box 702 and the ground truth bounding box (Bgt) 704. This enclosing box (en-box(Bpred, Bgt)) is used in the calculation of the GIoU loss to introduce an additional penalty on the YOLOS-PV convolutional neural network for non-overlapping bounding boxes, improving localization accuracy. The GIoU loss for the enclosing box (en-box(Bpred, Bgt)) is calculated using an equation 3.

$$GIoU =$$ (3)

$$(B_{pred}, B_{gt}) = IoU(B_{pred}, B_{gt}) - \frac{\text{en-box}(B_{pred}, B_{gt}) - B_{pred} \cup B_{gt}}{\text{en-box}(B_{pred}, B_{gt})}$$

In the above scenario, since $B_{pred} \cap B_{gt}=0$, the IoU($B_{pred}$, $B_{gt}$) is zero in equation 3, but the GIoU loss assigns a meaningful loss based on how far apart the Bpred bounding box 702 and the ground truth bounding box (Bgt) 704 are from each other.

In an embodiment, a GIoU loss metric extends the standard IoU loss by considering the overlap and structural differences between the Bpred bounding box 702 and the ground truth bounding box (Bgt) 704. Unlike convention IoU loss, which solely measures a ratio of intersection to union, the GIoU loss introduces a structural similarity component, making it a more robust localization loss function. Further, a total GIoU loss (depicted as GIoULoss) for all defects ('N' defects) present in the solar panels may be calculated using equation 4.

$$GIoULoss = \frac{1}{N}\sum_{i=1}^{N}\left(1 - GIoU(b_i, \hat{b}_i)\right)$$ (4)

In the equation 4, '$b_i$' represents a ground truth bounding box (Bgt) for an ith defect in an image (i.e., the infrared image). '$\hat{b}_i$' represents a Bpred bounding box for the ith defect in the image. 'GIoU($b_i$, $\hat{b}_i$)' is the GIoU loss computed between the Bpred bounding box and the ground truth bounding box (Bgt).

In an embodiment, the DETR model, also known as end-to-end object detection with transformers, introduces a novel approach to object detection (i.e., defects detection) by framing it as a set prediction task rather than relying on region proposal-based methods. A key innovation in the DETR model is its set prediction loss, which consists of two main components. A First component is a Binary Cross-Entropy (BCE) loss that measures a loss associated with defect classification, determining whether a defect belongs to a particular class. A second component is a set loss that evaluates how well the predicted defects set matches with ground truth defects set using the bipartite matching process. The BCE loss quantifies an error in predicting defects presence using an equation 5.

$$BCELoss(y, \hat{y}) = -\frac{1}{N}\sum_{i=1}^{N}\left[y_i \log(\hat{y}_i) + (1 - y_i)\log(1 - \hat{y}_i)\right]$$ (5)

In equation 5, 'y' represents ground truth binary labels (0 or 1) for N samples. '$\hat{y}$' represents predicted probabilities for a positive class. Further, 'log(·)' represents a natural logarithm function.

In an embodiment, the set loss evaluates the similarity between the Bpred bounding box and the ground truth bounding box (Bgt) using equation 6.

$$\text{Set Loss}(A,B) = BCELoss(C(A), \hat{C}(B)) + \lambda \mathcal{L}_{box}(L(A), \hat{L}(B))$$ (6)

In the equation 6, 'A' represents a ground truth defect set. 'B' represents a predicted defect set. 'C(A)' represents a binary mask indicating the presence or absence of defects and '$\hat{C}(B)$' represents a predicted mask. 'L(A)' and 'L(B)' represents ground truth and predicted bounding box location matrices, respectively. 'λ' represents a balancing hyperparameter controlling the balance between classification and localization losses.

Further, a bounding box localization error is computed as a liner combination of the GIoU loss and the L1 regression loss using equation 7.

$$\mathcal{L}_{box}(b_i, \hat{b}_{\sigma}(i)) = \lambda_{GIoU} GIoU(b_i, \hat{b}_{\sigma}(i)) + \lambda_{\ell_1} \|b_i - \hat{b}_{\sigma}(i)\|_1$$ (7)

In the equation 7, '$b_i$' represents the ground truth bounding box (Bgt) for an ith defect. '$\hat{b}_{\sigma}(i)$' represents the Bpred bounding box for the ith defect, selected based on hungarian matching to minimize a total matching cost. '$\lambda_{GIoU}$' and '$\lambda_{\ell_1}$' represents hyperparameters that control a relative weighting of the GIoU loss and the L1 regression loss. '$\|\cdot\|$' Represents a L1 norm. In an embodiment, the GIoU loss and the L1 regression loss are normalized by the number of defects in each batch of sample images (i.e., a sample of the infrared images).

In the YOLOS convolutional neural network, the L1 regression loss is utilized to quantify a discrepancy between the set of coordinates of the Bpred bounding box and a corresponding ground truth bounding box coordinates. Given an image (e.g., an infrared image) with N ground-truth defects, the Bpred bounding box for the ith defect, is represented as (xi, yi, wi, hi), i=1, 2, ... N where (xi, yi) represents a center (i.e., center coordinates) of an ith Bpred bounding box, and (wi, hi) represents a width and a height of the ith Bpred bounding box. Further, the set of ground-truth bounding box coordinates is denoted as (xi0, yi0, wi0, hi0). In an embodiment, the L1 regression loss for each ith Bpred bounding box is obtained using an equation 8.

$$L1(i) = |xi - xi0| + |yi - yi0| + |wi - wi0| + |hi - hi0|$$ (8)

Further, the total L1 loss L_L1 for all N objects in the image dataset are obtained by summing up all individual L1 losses across all defects. The total L1 loss L_L1 is obtained using equation 9.

$$L\_L1 = \Sigma L1(i), \text{ where } i=1,\ldots,N.$$ (9)

In an embodiment, a conventional linear combination of the GIoU loss and the L1 regression loss, as presented in equation 7, may be inefficient for certain defects detection tasks. The conventional linear combination of the GIoU loss and the L1 regression loss aims to address the challenge of handling bounding boxes at different scales, particularly small and large boxes, where relative errors may remain similar despite their absolute differences.

However, when the conventional linear combination is applied to perform defect localization in the solar panels using the YOLOS-PV convolutional neural network, this conventional linear combination often leads to ineffective bounding box predictions during inference. This inefficiency often resulted in overlapping bounding boxes with different class scores being assigned to the same defect.

To mitigate this issue of the conventional linear combination, the weighted loss combination is used. The weighted loss combination prioritizes either the GIoU loss or the L1 regression loss based on task requirements. This ensures better control over bounding box optimization, thus helping to suppress unnecessary bounding box losses. The weighted loss combination (depicted as a final weighted loss) uses two hyperparameters, i.e., '$W_{GIoU}$' and '$W_{\ell_1}$' (also depicted as '$W_{L_1}$') as respective weights for the GIoU loss or the L1 regression loss. The weighted loss combination is calculated using equation 10.

$$\text{Final Weighted Loss} = W_{GIoU} \cdot \text{GIoU Loss} + W_{\ell_1} \cdot \mathcal{L}_{\ell_1}$$ (10)

In above equation 10, a sum of '$W_{GIoU}$' and '$W_{\ell_1}$' equals to 1, ensuring a balanced contribution from both loss components, i.e., the GIoU loss or the L1 regression loss. Final weighted loss and the combined weighted loss refer to the same concept mathematically. The term combined weighted loss refers to the formula (10) used to construct the loss function while final weighted loss refers to the evaluated result. For example, FIG. 10A-C report a final weighted loss of 1.100, when $W_{GIoU}$=0.75 and $W_{\ell_1}$=0.25.

Further, by modifying equation 7, the weighted loss combination is expressed as depicted via equation 11.

$$\text{Weighted } \mathcal{L}_{box}(b_i,\hat{b}_\sigma(i)) = W_{GIoU} \cdot \lambda_{GIoU} \text{GIoU}(b_i,\hat{b}_\sigma(i)) + W_{\ell_1} \cdot \lambda_{\ell_1} \|b_i - \hat{b}_\sigma(i)\|_1 \quad (11)$$

Figure 8:
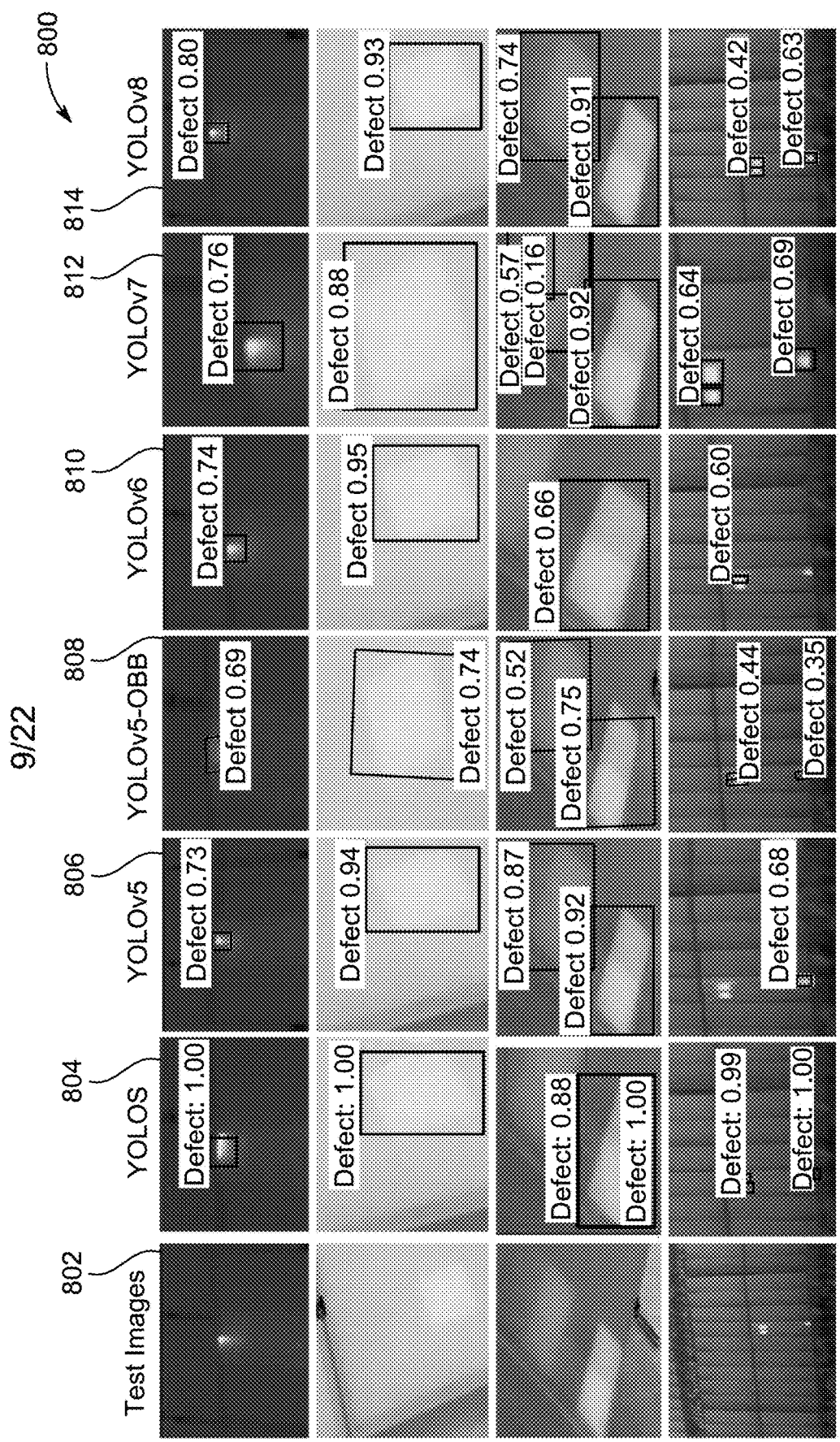
FIG. 8 is an exemplary diagram illustrating inference experimental results obtained for infrared images using six You Look Only Once (YOLO) model variants, according to certain embodiments.

Referring now to FIG. 8, the present disclosure provides an exemplary diagram 800 illustrating inference experimental results obtained for infrared images using YOLO model variants, according to certain embodiments. The YOLO model variants include the YOLOv5, the YOLOv5-OBB, the YOLOv6, the YOLOv7, the YOLOv8, and the YOLOS. Apart from these YOLO variants, other variants are listed in Table 3. The experimental results were obtained based on a total of 100 training epochs for each YOLO model variant. Further, training parameters used includes a set of 16 infrared images. Each infrared image of the set of 16 infrared images has a pixel size of 640*640 pixels. A learning rate is defined as $2.5\times10^{-5}$, and a weight decay is defined as $1.0\times10^{-4}$.

As depicted in FIG. 8, each row of a first column 'test image 802' represents a set of four test images. Further, each row of a second column 'YOLOS 804' represents results (i.e., images depicting defects in the solar panels) obtained based on processing performed by the YOLOS on each of the set of four images. Further, each row of a third column 'YOLOv5 806' represents results obtained based on processing performed by the YOLOv5 on each of the set of four images. Further, each row of a fourth column 'YOLOv5-OBB 808' represents results obtained based on processing performed by the YOLOv5-OBB on each of the set of four images. Further, each row of a fifth column 'YOLOv6 810' represents results obtained based on processing performed by the YOLOv6 on each of the set of four images. Further, each row of a sixth column 'YOLOv7 812' represents results obtained based on processing performed by the YOLOv7 on each of the set of four images. Further, each row of a sixth column 'YOLOv8 814' represents results obtained based on processing performed by the YOLOv8 on each of the set of four images.

Further, the results obtained based on the processing of test infrared images (e.g., the set of four infrared images depicted via the first column 'test image 802') by various YOLO variants are summarized in Table 3.

TABLE 3

| Models | Precision | Recall | mAR @0.5:0.95 | mAP @0.5 | mAP @0.5:0.95 |
|---|---|---|---|---|---|
| Tommaso (Yolov3) | — | — | — | 0.700 | — |
| Zhu (TPH-YOLOv5) | — | — | — | — | 0.394 |
| Pathak (faster RCNN) | — | — | — | — | 0.670 |
| Sun (YOLOv5) | — | — | 0.890 | — | 0.878 |
| YOLOv5 | 0.692 | 0.491 | — | 0.511 | 0.258 |
| YOLOv5-OBB | 0.673 | 0.371 | — | 0.411 | 0.153 |
| YOLOv6 | — | — | 0.835 | 0.483 | 0.767 |
| YOLOv7 | 0.805 | 0.769 | — | 0.796 | 0.370 |

TABLE 3-continued

| Models | Precision | Recall | mAR @0.5:0.95 | mAP @0.5 | mAP @0.5:0.95 |
|---|---|---|---|---|---|
| YOLOv8 | 0.715 | 0.691 | — | 0.752 | 0.463 |
| YOLOS | — | — | 0.952* | 0.335 | 0.867 |
| YOLOS-PV | — | — | 0.952* | 0.335 | 0.894* |

In Table 3, each row of a first column 'model' represents a name of each YOLO model variant. Each row of a second column 'precision' represents a ratio of correctly detected defects to total detected defects. Each row of a third column 'recall' represents a ratio of correctly detected defects to actual defects present. Each row of a fourth column 'mAR @0.5:0.95' represents a mean Average Recall (mAR) calculated across IoU thresholds from 0.50 to 0.95 in increments of 0.05. Each row of a fifth column 'mAP @0.5' represents a mean Average Precision (mAP) when an IoU threshold is fixed at 0.50 (a more lenient detection metric). Each row of a sixth column, 'mAP @0.5:0.95,' represents mAP over multiple IoU thresholds (0.50 to 0.95), representing the YOLO model variant's overall detection accuracy across varying levels of localization precision.

In an embodiment, a mAP@0.5 value of 1.0 represents perfect detection, while 0.0 indicates complete failure. The achieved mAP@0.5:0.95 value of 0.867 suggests that the YOLOS successfully detects 86.70% of defects within the test dataset (i.e., test infrared images) across different IoU thresholds. Further, to facilitate comparison, the detection performance of each YOLO model variant was magnified for detailed score analysis. The results demonstrate that the YOLOS exhibits higher confidence scores (approaching 1.0) for nearly all defect objects compared to other YOLO model variants. However, in certain cases, the YOLOS exhibited overlapping bounding box predictions, which may require further optimization to enhance localization accuracy.

Further, as depicted in Table 3, the YOLOS-PV convolution neural network outperforms other YOLO variants. To optimize bounding box predictions, the weighted loss combination of the GIoU loss or the L1 regression loss are systematically varied between 0 and 1 in increments of 0.25 while ensuring that their sum remains equal to 1. This evaluation of the YOLOS-PV convolution neural network is conducted within a training window spanning epochs 50 to 59 to assess the impact of different weighted loss combinations on defect localization in solar infrared images.

Further, as illustrated in FIG. 9A-9D, an optimal weighted loss combination configuration is determined to be $W_{\ell_1}$=0.25 and $W_{GIoU}$=0.75. Notably, an alternative weighted loss combination configuration of $W_{\ell_1}$=1 and $W_{GIoU}$=0 effectively eliminates the GIoU loss component, leading to increased bounding box overlap and reduced localization accuracy. This is further depicted and explained in conjunction with FIGS. 9A to 9D. Given that the GIoU loss plays a crucial role in quantifying the dissimilarity between bounding boxes and refining their overlap, the weighted loss combination configuration of $W_{\ell_1}$=0.25 and $W_{GIoU}$=0.75 is adopted for the YOLOS-PV convolution neural network. The YOLOS-PV convolution neural network is subsequently trained using the same hyperparameter settings applied to other YOLO model variants. The trained configuration leads to an improvement in mAP@0.5:0.95, which increases to 0.894, as presented in Table 3.

To further analyze the impact of weight activation states on total loss, an experiment is conducted where both weights are set to zero (OFF). As expected, this results in a total loss of zero. Conversely, when both weights are activated (ON), the total weight sum in equation 11 becomes $W_{\ell_1} + W_{GIoU} = 2$. Consequently, an ON state results in a final weighted loss of 2×0.884=1.768, which is higher than the 1.100 loss value observed in previous YOLOS-PV experimental results. FIG. 8 illustrates this effect. These findings confirm that the selective tuning of $W_{\ell_1}$ and $W_{GIoU}$ is critical for achieving optimal defect localization in solar infrared imaging applications.

Figure 9A:
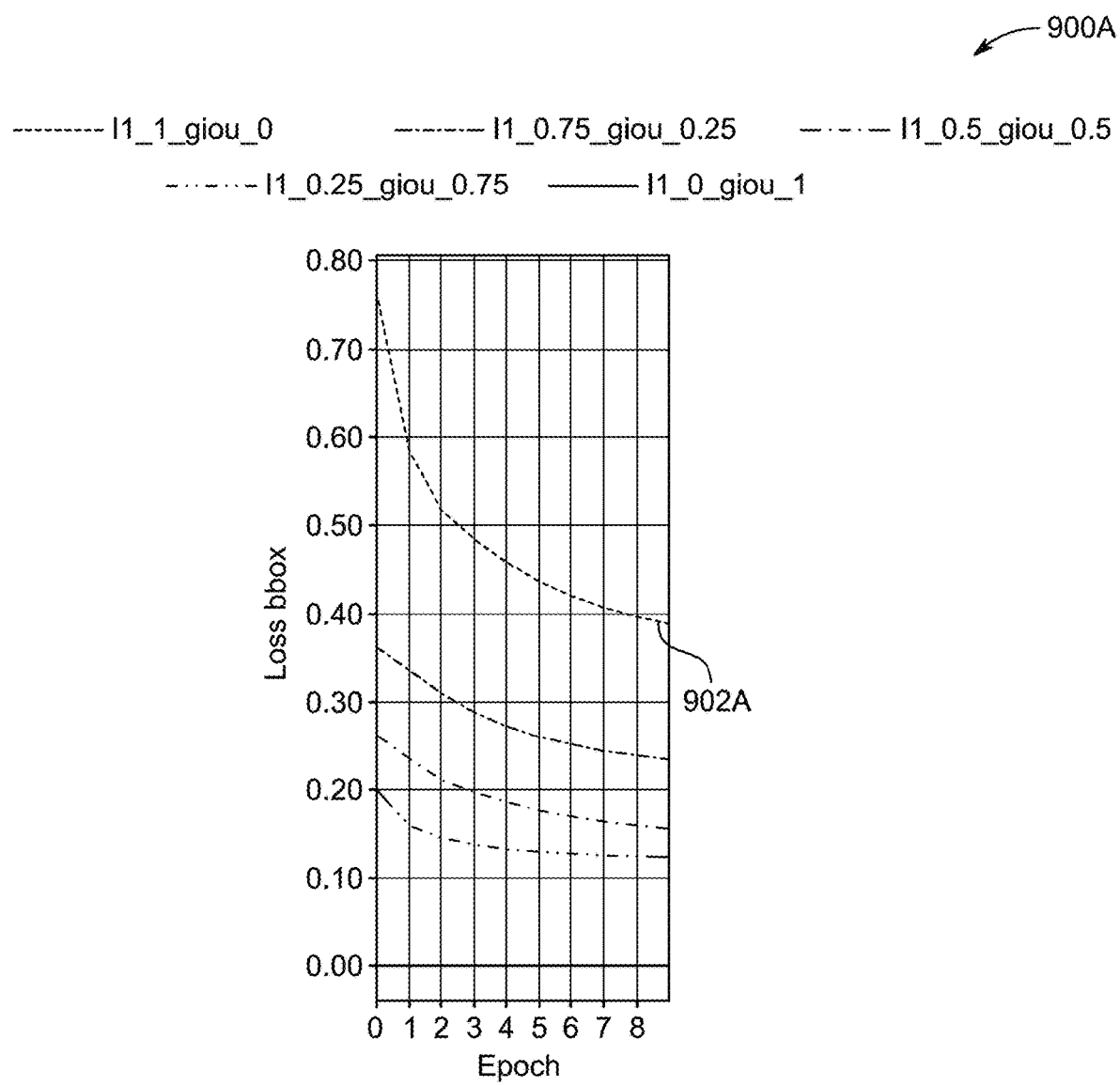
FIG. 9A is an exemplary graph representing a decrease in bounding box loss over multiple epochs for different weighted loss combinations, according to certain embodiments.

Referring now to FIG. 9A, the present disclosure provides an exemplary graph 900A representing a decrease in bounding box loss over multiple epochs for different weighted loss combinations, according to certain embodiments. The graph 900A represents the bounding box loss over the total of 100 training epochs for different weighted loss combinations of $W_{\ell_1}$ (L1 regression loss) and $W_{GIoU}$ (GIoU loss). As depicted via the graph 900A, an x-axis represents a number of training epochs (for example, from 0 to 8). Further, a y-axis represents the L1 regression loss (depicted as loss bbox), which measures the difference between the set of coordinates associated with Bpred bounding boxes and the set of ground-truth bounding box coordinates. Further, curves (e.g., a curve 902A) show that when L1=1 and GIoU=0, the bounding box loss starts at a higher value but decreases steadily. Further, when GIoU contributes more (e.g., L1=0.25, GIoU=0.75), the bounding box loss starts lower and decreases more efficiently, indicating improved localization.

Figure 9B:
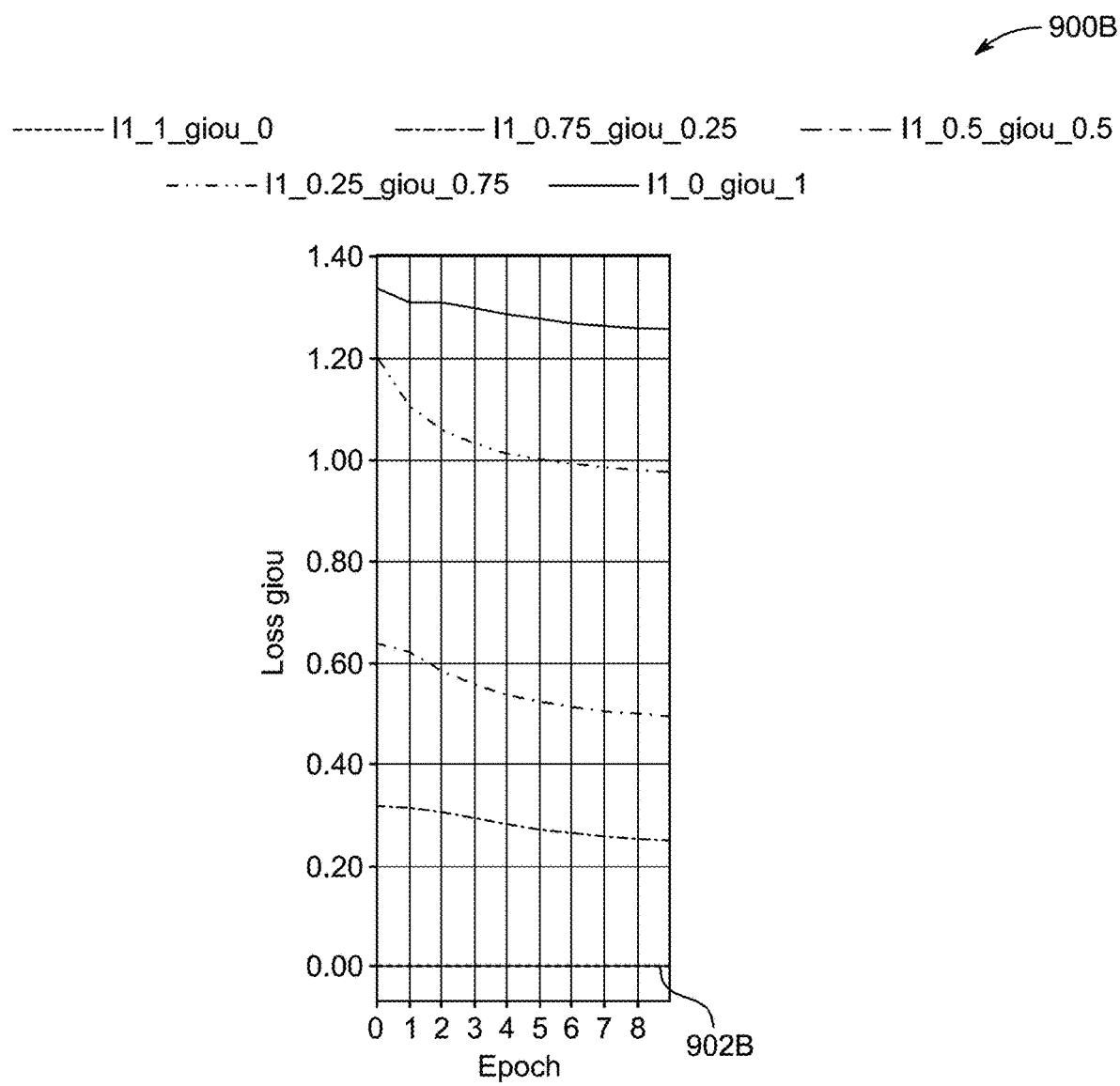
FIG. 9B is an exemplary graph representing the GIoU loss over multiple epochs for different weighted loss combinations, according to certain embodiments.

Referring now to FIG. 9B, the present disclosure provides an exemplary graph 900B representing the GIoU loss over multiple epochs for different weighted loss combinations, according to certain embodiments. In particular, the graph 900B measures the GIoU loss over the total of 100 training epochs. As depicted via the graph 900B, an x-axis represents a number of training epochs (for example, from 0 to 8). Further, a y-axis represents the GIoU loss (depicted as loss giou), which evaluates the overlap between the predicted bounding boxes (i.e., the Bpred bounding boxes) and the ground truth bounding boxes (Bgt). In an embodiment, a higher GIoU weight results in an initially higher loss, but it declines more efficiently over time, as depicted in the graph 900B. Further, the L1=0.25, GIoU=0.75 combination achieves a final GIoU loss of 0.970, making it the most effective for improving bounding box alignment. Further, each line (curve or straight) represents how the GIoU loss evolves over the total of 100 training epochs for different weight combinations of $W_{\ell_1}$ (L1 regression loss) and $W_{GIoU}$ (GIoU loss). For example, a straight line 904B represents complete ignorance of the GIoU loss, leading to a consistently higher and less effective GIoU loss.

Figure 9C:
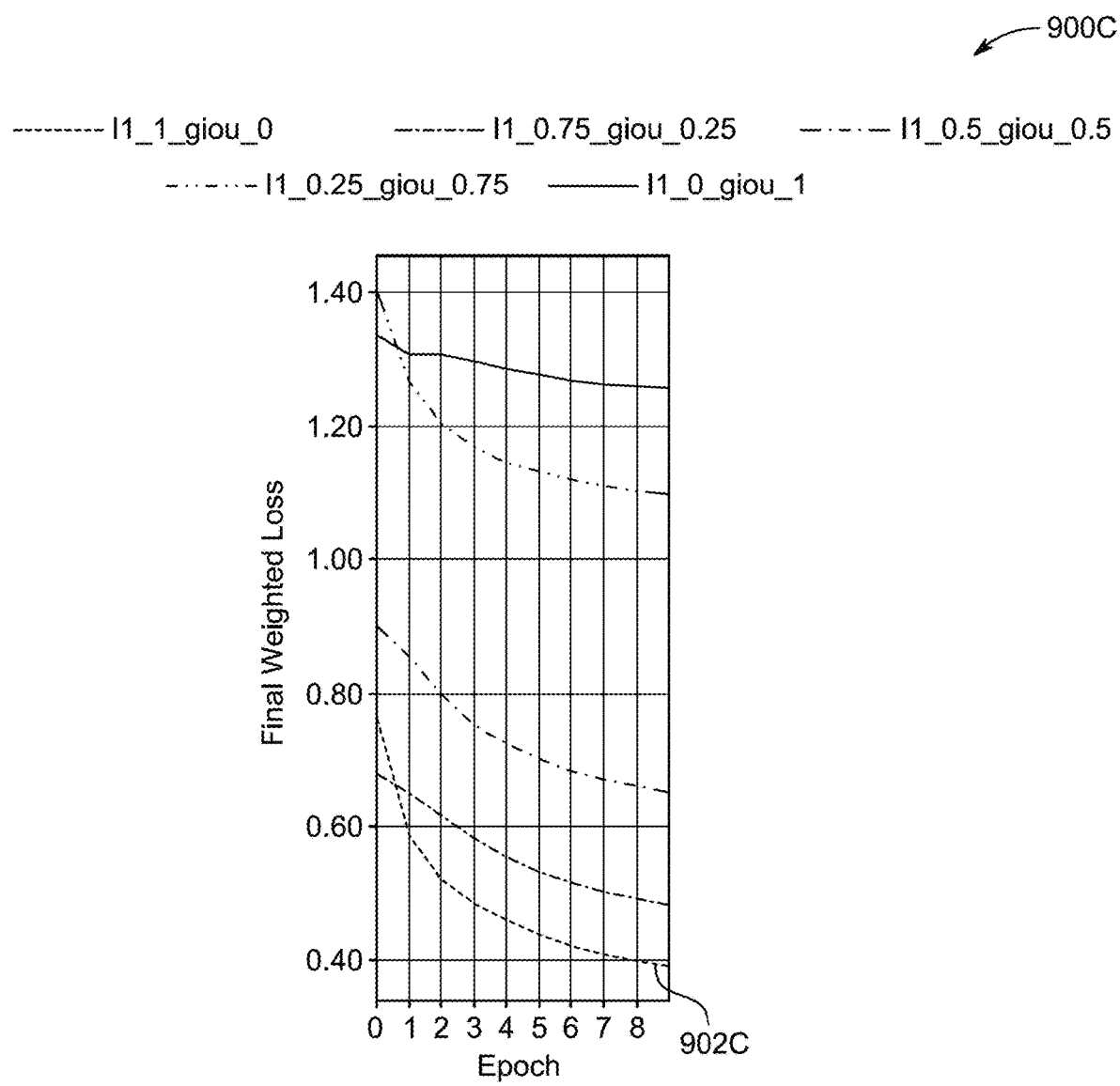
FIG. 9C is an exemplary graph representing a weighted loss combination of an L1 regression loss and the GIoU loss over multiple epochs for different weighted loss combinations, according to certain embodiments.

Referring now to FIG. 9C, the present disclosure provides an exemplary graph 900C representing a weighted loss combination of the L1 regression loss and the GIoU loss over multiple epochs for different weighted loss combinations, according to certain embodiments. In particular, the graph 900C shows the weighted loss combination calculated as a combination of the L1 regression loss and the GIoU loss over the total of 100 training epochs. As depicted via the graph 900C, an x-axis represents a number of training epochs (for example, from 0 to 8). Further, a y-axis represents the weighted loss combination (depicted as a final weighted loss). Further, each curve in the graph 900C corresponds to a different weighted loss combination of $W_{\ell_1}$ (L1 regression loss) and $W_{GIoU}$ (GIoU loss). For example, a curve 902C (depicted as a fifth curve line) with $\ell 1=0.1$, GIoU=0, represents the weighted loss combination that is calculated entirely based on the L1 regression loss, ignoring the GIoU loss. Further, the weight loss combination ($\ell 1=0.25$, GIoU=0.75) (depicted via a second curve line) achieves the best reduction in final weighted loss, stabilizing around 1.100 during training.

Figure 9D:
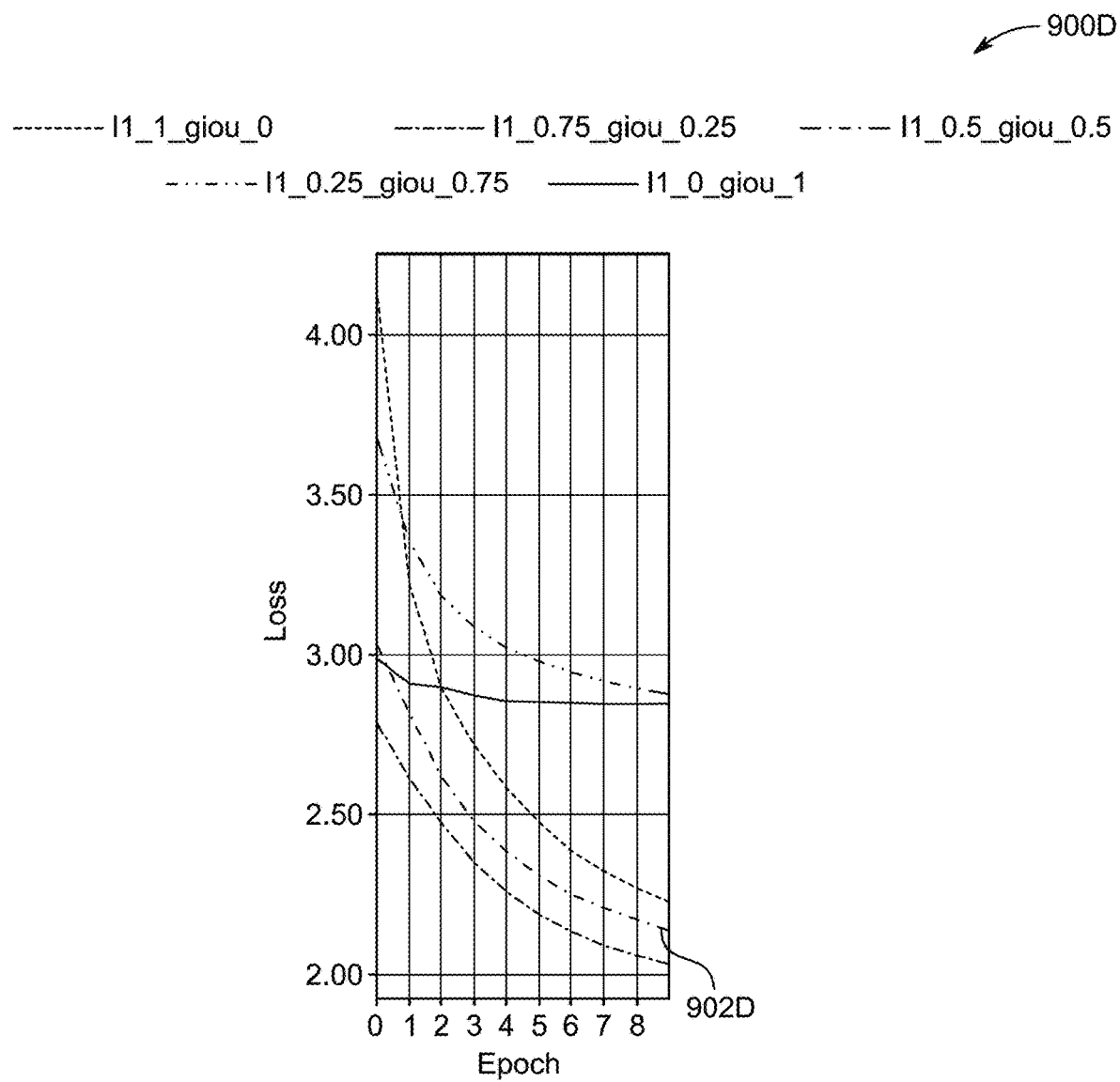
FIG. 9D is an exemplary graph representing a total L1 loss over multiple epochs for different weighted loss combinations, according to certain embodiments.

Referring now to FIG. 9D, the present disclosure provides an exemplary graph 900D representing a total L1 loss over multiple epochs for different weighted loss combinations, according to certain embodiments. The graph 900D represents the total L1 loss (L_L1) obtained during training for the total of 100 training epochs. As depicted via the graph 900D, the total L1 loss follows a downward trend across all weighted loss combinations. As depicted via the graph 900D, an x-axis represents a number of training epochs (for example, from 0 to 8). Further, a y-axis represents the total L1 loss (depicted as loss). Each curve in the graph 900D represents the total L1 loss trend for a specific weight configuration. For example, a curve 902D ($\ell 1=0.5$, GIoU=0.5) represents a balanced combination of the L1 regression loss and the GIoU loss.

Figure 10A:
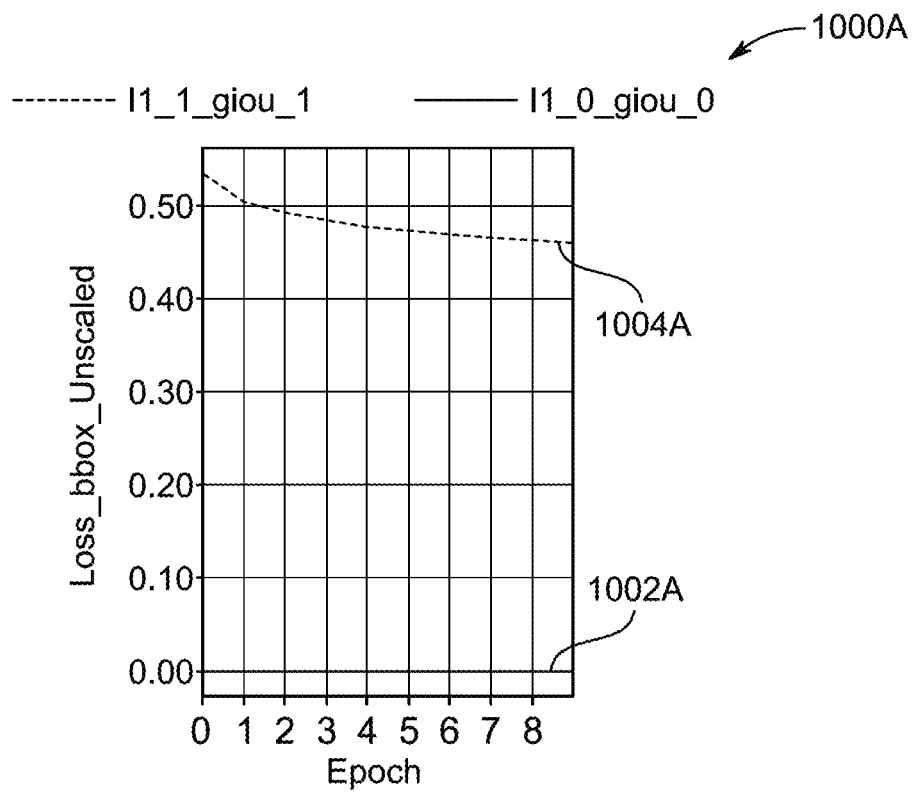
FIG. 10A is an exemplary graph representing a decrease in an unscaled bounding box loss over multiple epochs for different weight configurations, according to certain embodiments.

Referring now to FIG. 10A, the present disclosure provides an exemplary graph 1000A representing a decrease in an unscaled bounding box loss over multiple epochs for different weight configurations (i.e., the weighted loss combinations), according to certain embodiments. In the graph 1000A, an x-axis represents training epochs (0 to 8). A y-axis represents the L1 regression loss (depicted as loss bbox unscaled), measuring how well the predicted bounding boxes (i.e., the plurality of Bpred bounding boxes) align with the ground truth bounding boxes (Bgt). Further, a straight line 1002A ($\ell 1=0$, GIoU=0) remains at zero, confirming that no learning occurs in an OFF state. A curve line 1004A ($\ell 1=1$, GIoU=1) shows a gradual decrease in bounding box loss as training progresses.

Figure 10B:
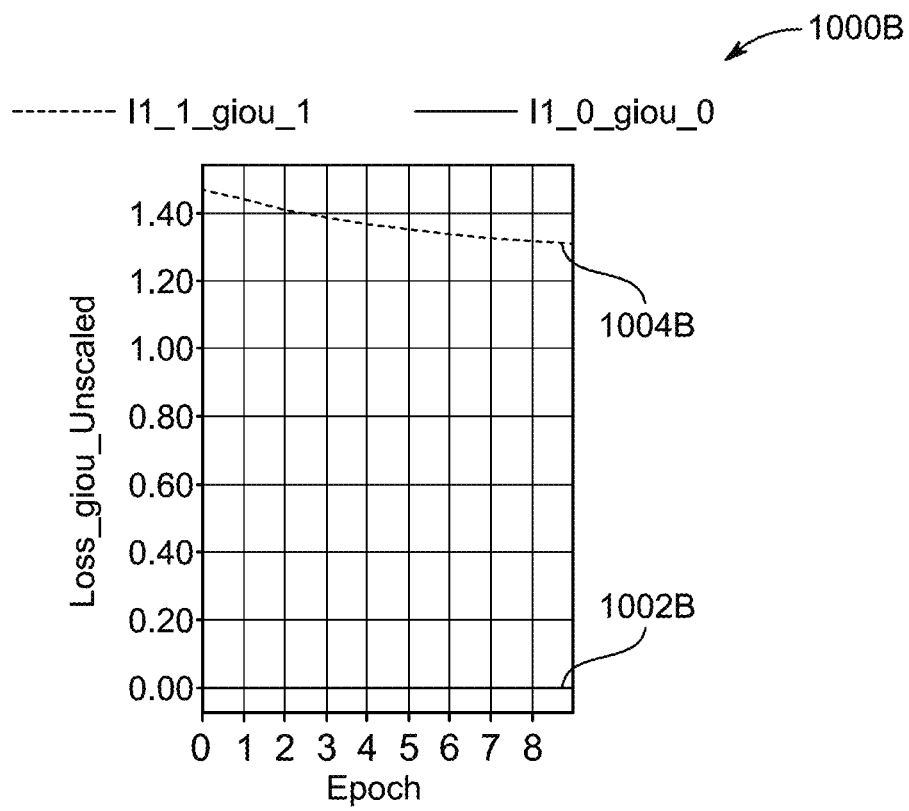
FIG. 10B is an exemplary graph representing variation in an unsealed GIoU loss across multiple epochs for different weight configurations, according to certain embodiments.

Referring now to FIG. 10B, the present disclosure provides an exemplary graph 1000B representing variation in an unsealed GIoU loss across multiple epochs for different weight configurations, according to certain embodiments. In the graph 1000B, an x-axis represents training epochs (0 to 8). A y-axis represents the GIoU loss (depicted as loss giou unscaled), which quantifies how well the predicted bounding boxes (i.e., the plurality of Bpred bounding boxes) overlaps with the ground truth bounding boxes (Bgt). Further, a straight line 1002B ($\ell 1=0$, GIoU=0) remains flat at zero, indicating no loss calculations in the OFF state. A curve line 1004B ($\ell 1=1$, GIoU=1) shows a high loss at the start that decreases over training, improving bounding box alignment.

Figure 10C:
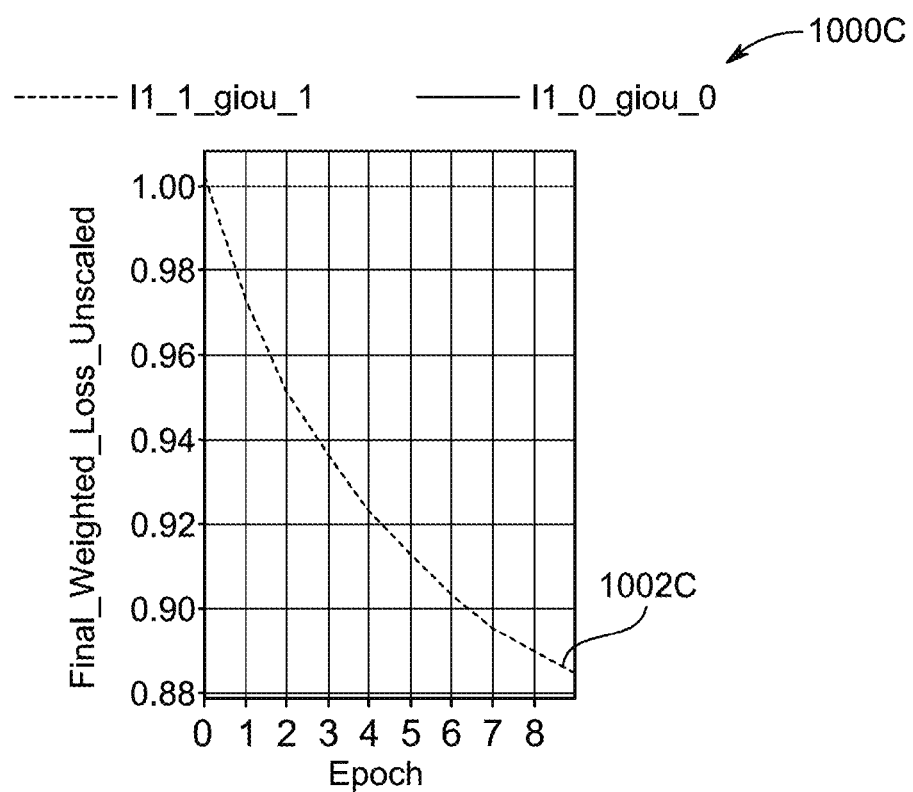
FIG. 10C is an exemplary graph diagram representing an unscaled final weighted loss across multiple epochs for different weight configurations, according to certain embodiments.

Referring now to FIG. 10C, the present disclosure provides an exemplary graph 1000C diagram representing an unscaled final weighted loss across multiple epochs for different weight configurations, according to certain embodiments. In the graph 1000C, an x-axis represents training epochs (0 to 8). A y-axis represents the weighted loss combination of the L1 regression loss and the GIoU loss (depicted as final weighted loss unscaled). Further, a straight line 1002C ($\ell 1=0$, GIoU=0) remains flat at zero, indicating that no learning occurs in the OFF state. A curve line 1004C ($\ell 1=1$, GIoU=1) shows a continuous decline in the total L1 loss, indicating a final loss value higher (1.768) than an optimized YOLOS-PV configuration (1.100).

Figure 11:
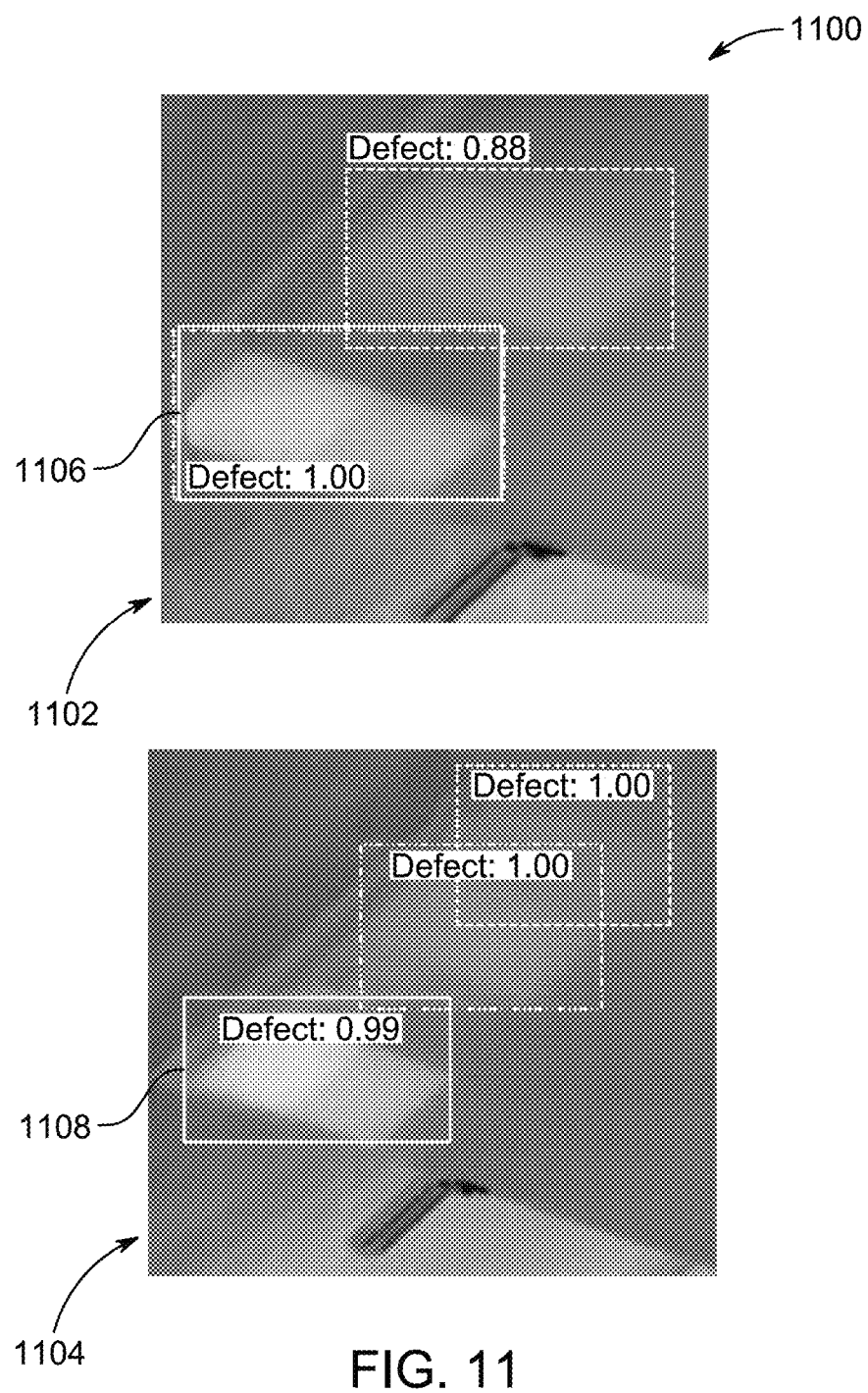
FIG. 11 is an exemplary diagram representing images depicting defects detected in a solar panel using different convolution neural network models, according to certain embodiments.

Referring now to FIG. 11, the present disclosure provides an exemplary diagram 1100 representing images depicting defects detected in a solar panel using different convolution neural network models, according to certain embodiments. The different convolution neural network models may correspond to the YOLOS (existing model) and the YOLOS-PV convolution neural network (current disclosed model). In particular, the FIG. 11 represents a comparative analysis of defect detection in solar panels using the YOLOS and the YOLOS-PV convolution neural network. An image 1102 represents results obtained based on the processing of a corresponding input image using the YOLOS. Further, an image 1104 represents results obtained based on the processing of a corresponding input image (i.e., the infrared image) using the YOLOS-PV convolution neural network.

The image 1102 represents two defects (e.g., a defect 1106) identified by the YOLOS with confidence scores of 1.00 and 0.88. Further, as depicted in the image 1102, bounding boxes corresponding to the two identified defects are less precise, leading to potential localization errors. Further, some bounding boxes do not perfectly align with defect regions in the image 1102, which may indicate suboptimal loss weighting. The image 1104 represents three defects (e.g., a defect 1108) identified using the YOLOS-PV convolution neural network, with confidence scores of 1.00, 1.00, and 0.99. Further, as depicted in the image 1104, bounding boxes corresponding to the three identified defects are better aligned with defects region. Further, higher confidence scores and improved localization of the defects in the image 1104 using the bounding boxes indicate that the YOLOS-PV convolution neural network enhances defects detection accuracy in the solar panels.

Figure 12:
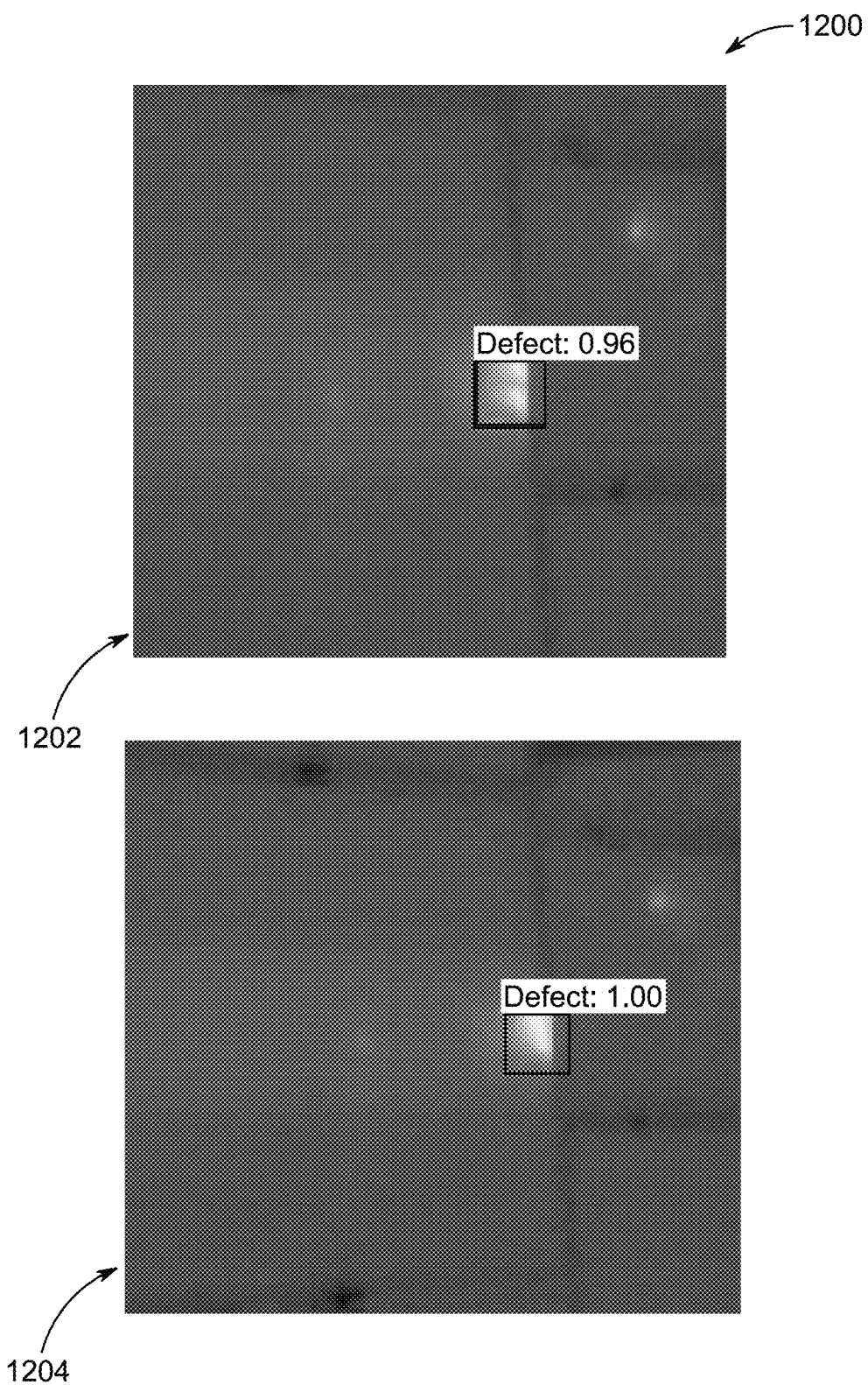
FIG. 12 is another exemplary diagram representing images depicting defects detected in a solar panel using different convolution neural network models, according to certain embodiments.

Referring now to FIG. 12, the present disclosure provides another exemplary diagram 1200 representing images depicting defects detected in a solar panel using different convolution neural network models, according to certain embodiments. The different convolution neural network models may correspond to the YOLOS (existing model) and the YOLOS-PV convolution neural network (current disclosed model). In particular, the FIG. 12 represents the comparative analysis of defect detection in the solar panels using the YOLOS and the YOLOS-PV convolution neural network. An image 1202 represents results obtained based on the processing of a corresponding input image using the YOLOS. Further, an image 1204 represents results obtained based on the processing of a corresponding input image (i.e., the infrared image) using the YOLOS-PV convolution neural network.

The image 1202 represents one defect identified by the YOLOS with a confidence score of 0.96. Further, as depicted in the image 1102, a bounding box corresponding to the identified defect is misaligned with the defect region, leading to potential localization errors. The image 1204 represents the same defect identified using the YOLOS-PV convolution neural network, with a higher confidence score of 1.00. Further, as depicted in the image 1204, the bounding box is better aligned with the defect region, indicating improved localization accuracy.

In an embodiment, the images 1102 and 1104 of FIG. 11, and the images 1202 and 1204 demonstrate that the YOLOS-PV convolution neural network achieves superior bounding box selection, effectively minimizing overlapping detections compared to the existing YOLOS. Further, a Table 4 represents a comparative analysis of the YOLOS-PV convolution neural network against six other YOLO model variants.

TABLE 4

| Models | mAP @0.5:0.95(%) |
|---|---|
| YOLOv5 | 25.8 |
| YOLOv5-OBB | 15.3 |
| YOLOv6 | 76.7 |
| YOLOv7 | 37.0 |
| YOLOv8 | 46.3 |

TABLE 4-continued

| Models | mAP @0.5:0.95(%) |
|---|---|
| YOLOS | 86.7 |
| YOLOS-PV | 89.4 |

In Table 4, each column of a first row 'model' represents a name of existing YOLO model variants and the current disclosed model, i.e., YOLOS-PV convolution neural network. Further, each column of a second row 'mAP @0.5: 0.95(%)' represents the mAP at an IoU threshold range of 0.5 to 0.95. Further, as depicted via the Table 4, the YOLOS-PV convolution neural network outperforms these existing YOLO model variants, achieving the mAP @0.5:0.95 of 89.4%. This highlights the enhanced inference capabilities of the YOLOS-PV convolution neural network, particularly in generating precise bounding box predictions while eliminating redundant or overlapping detections, thereby optimizing defect localization accuracy.

In particular, an implementation of the weighted loss combination in the YOLOS-PV convolution neural network has demonstrated superior performance, achieving the mAP @0.5:0.95 of 89.4%, compared to the YOLOS, i.e., 86.7%. The YOLOS lacks Non-Maximum Suppression (NMS) techniques, frequently produces overlapping bounding boxes during predictions. By integrating the weighted loss combination, the YOLOS-PV convolution neural network effectively mitigates these challenges of existing YOLO model variants, particularly in detecting defects in the solar panels. The YOLOS-PV convolution neural network enhances the separation of overlapping bounding boxes and improves confidence scores of detected defects, leading to more precise and reliable defect localization.

Figure 13:
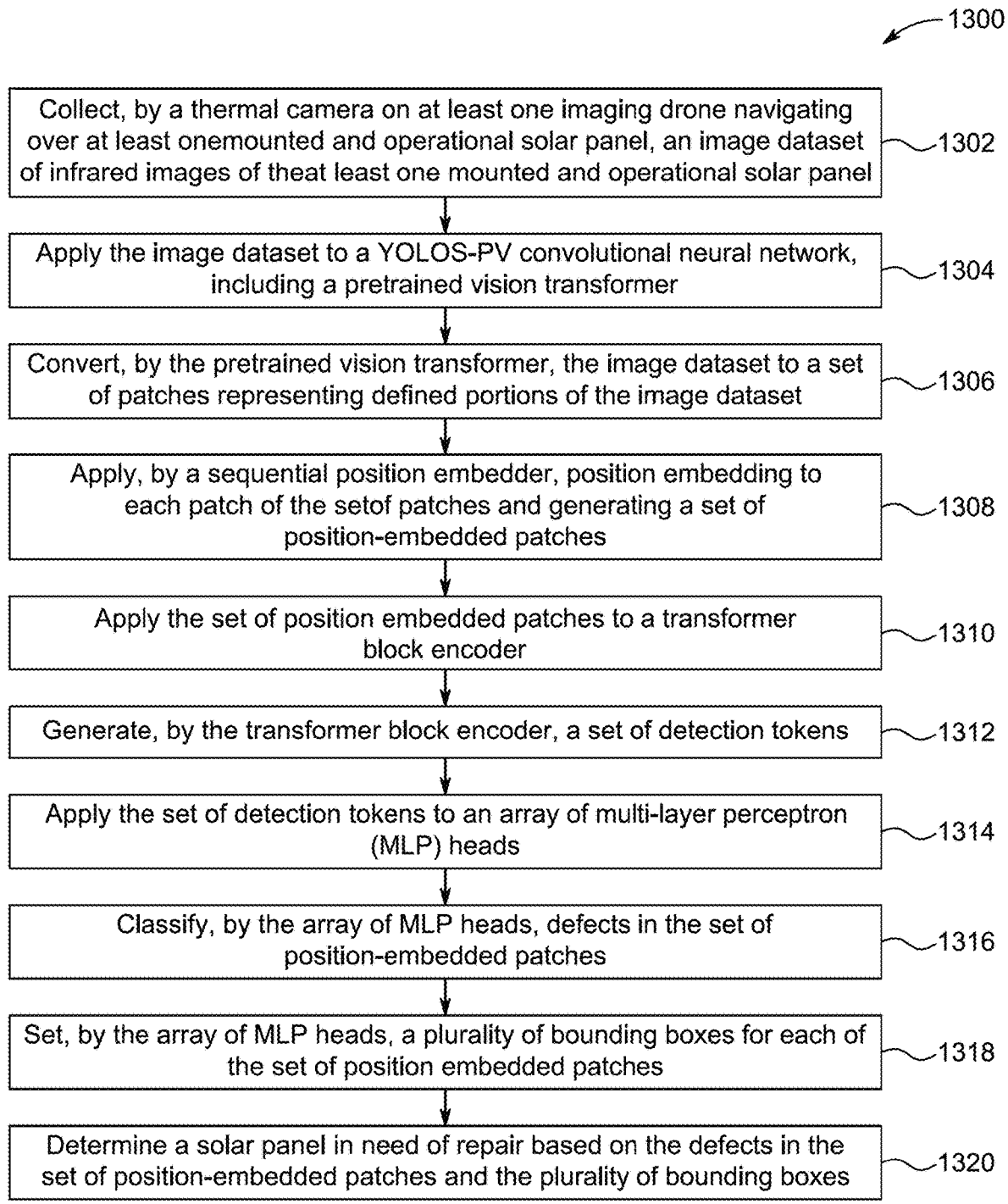
FIG. 13 is an exemplary diagram of a method detecting defects in solar panels, according to certain embodiments.

Referring now to FIG. 13, the present disclosure provides an exemplary diagram of a method 1300 detecting defects in solar panels, according to certain embodiments. In order to detect defects in the solar panels, initially, at step 1302, the image dataset of infrared images of the at least one mounted and operational solar panel is collected. The image data is collected using the thermal camera on the at least one imaging drone navigating over the at least one mounted and operational solar panel. In an embodiment, the thermal camera is configured to capture temperature variations in the at least one mounted and operational solar panel to identify the defects that are not visible in regular optical images. Examples of the at least one imaging drone may include, but are not limited to, the DJI Matrice 300 RTK, the DJI Mavic 3T, the Parrot Anafi, and the Autel EVO II Dual 640T. Examples of the thermal camera may include the FUR Vue Pro R camera, the DJI Zenmuse H20T camera, the WIRIS pro, and the like. In an embodiment, the defects associated with the at least one mounted and operational solar panel may include, but are not limited to, a hotspot, a crack, a broken glass, a soiled area, a corroded area, a delamination, a bubble, an induced degradation, and a diode defect.

Once the image dataset is captured, at step 1304, the image dataset is applied to the YOLOS-PV convolutional neural network, including the pretrained vision transformer. The pretrained vision transformer is trained based on a training dataset including a plurality of infrared images depicting defects in the solar panels. In particular, the YOLOS-PV convolutional neural network is trained on a dataset (i.e., the training dataset) of solar panel infrared images (also referred to as represent different defects (also referred to as objects) identified in the infrared image) containing known defects with annotated bounding boxes.

At step 1306, the pretrained vision transformer is configured to convert the image dataset to the set of patches. The set of patches represents defined portions of the image dataset. Further, based on the conversion, at step 1308, the position embedding is applied to each patch of the set of patches using a sequential position embedder. In other words, the sequential position embedder is configured to assign the position embedding to each patch in a sequence to retain spatial information.

Once the position embedding is applied to each patch, the sequential position embedder is configured to generate the set of position embedded patches. Further, at step 1310, the set of position embedded patches is applied to the transformer block encoder. In an embodiment, the set of position embedded patches refers to image patches that have been assigned the position embedding to preserve spatial relationships. These set of position embedded patches serve as input to the transformer block encoder for feature extraction and defect detection in the infrared images. Upon applying the set of position embedded patches, at step 1312, a set of detection tokens is generated using the transformer block encoder. A detection token is a learnable embedding generated by the transformer block encoder to represent object-level features in an infrared image. Each detection token helps in predicting bounding boxes and class labels for defect detection in the solar panels.

Once the set of detection tokens is generated, at step 1314, the set of detection tokens is applied to the array of MLP heads. At step 1316, the array of the MLP heads is then configured to classify defects in the set of position embedded patches. For example, the defects classified by the MLP heads include the hotspot, the crack, the broken glass, the soiled area, the corroded area, the delamination, the bubble, the induced degradation, the diode defect, and the like. Upon classifying the defects, at step 1318, the MLP heads are configured to set the plurality of Bpred bounding boxes (also referred to as the predicted bounding boxes) for each of the set of position embedded patches. After setting the plurality of Bpred bounding boxes, at step 1320, the solar panel in need of repair is identified based on the defects in the set of position embedded patches and the plurality of Bpred bounding boxes. In an embodiment, the determination of which solar panel needs repair includes calculating the total loss based on the weighted loss combination across all detected objects in the image dataset.

In particular, the identification of the solar panel in need of repair includes calculating the weighted loss combination. The weighted loss combination includes a first weight of 0.750 applied to the GIoU loss and a second weight of 0.250 applied to the L1 regression loss for the plurality of Bpred bounding boxes. To calculate the weighted loss combination, initially, the set of coordinates (xi, yi, wi, hi), i=1, 2, ... N of each ith Bpred bounding box is calculated. In the set of coordinates, a coordinate (xi, yi) denotes a center of an ith Bpred bounding box (also referred to as the center coordinates), and (wi, hi) represents the width and the height of the ith Bpred bounding box. Once the set of coordinates is calculated, the L1 loss is calculated between the set of coordinates of each ith Bpred bounding box and the set of ground-truth bounding box coordinates (xi0, yi0, wi0, hi0). The set of ground-truth bounding box coordinates (xi0, yi0, wi0, hi0) are pre-stored in a database associated with a system configured for detecting defects in the solar panels. In an embodiment, the L1 loss for each ith Bpred bounding box is calculated using equation 8.

Once the L1 loss for each Bpred bounding box is calculated, the total L1 loss L_L1 for all N objects in the image dataset are calculated using equation 9. The total L1 loss L_L1 corresponds to the L1 regression loss. After calculating the total L1 loss L_L1, the GIoU loss is calculated using equation 3. Further, based on the L1 regression loss and the GIoU loss, the weighted loss combination is computed. The weighted loss combination reduces overlapping Bpred bounding boxes for different object classes by assigning higher priority to the GIoU loss than to the L1 regression loss. In other words, the weighted loss combination resolves overlapping Bpred bounding boxes for different object classes. In an embodiment, the GIoU loss accounts for non-overlapping bounding boxes by incorporating a penalty based on a size of an enclosing box containing both Bpred and Bgt bounding boxes. The Bpred bounding boxes corresponds to the predicted bounding boxes. The Bgt bounding boxes corresponds to the ground-truth bounding boxes. In an embodiment, the weighted loss combination is calculated using equation 12.

$$\text{Weighted}_{Lbox(bi,\hat{b}\sigma(i))} = \qquad (12)$$
$$(0.750 \times \lambda GIoU \times GIoU(bi, \hat{b}\sigma(i)) + 0.250 \times \lambda L1 \times \|bi - \hat{b}\sigma(i)\|1) /$$
$$(0.750 + 0.250)$$

In the equation 12, 'bi' denotes an ith ground-truth bounding box, '$\hat{b}\sigma(i)$' denotes a prediction with a lowest cost from 'bi', '$\lambda$GIoU' and '$\lambda$L1' are scaling factors for respective loss components.

Figure 5B:
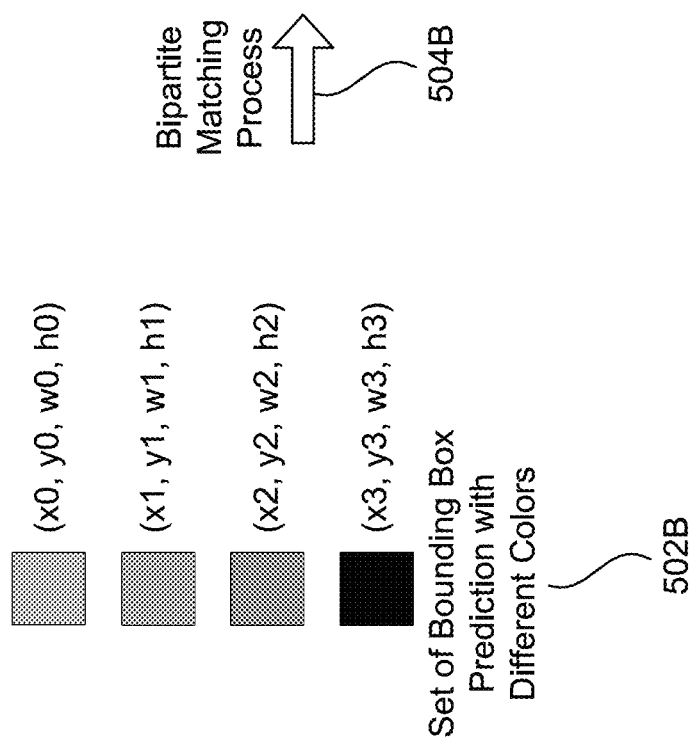
Figure 14:
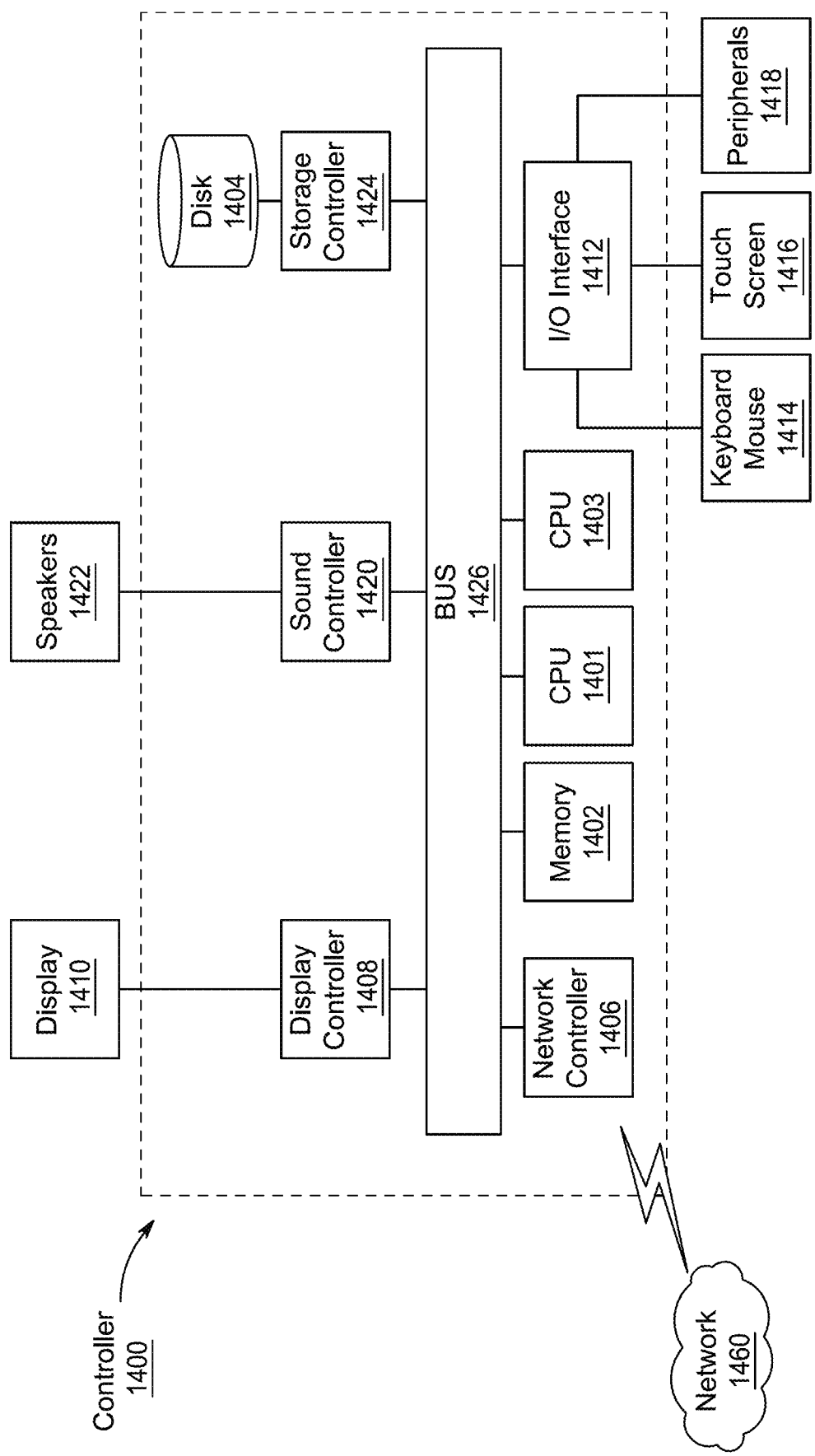
FIG. 14 is an illustration of a non-limiting example of details of computing hardware used in the computing system, according to certain embodiments.

Next, further details of the hardware description of the computing environment according to exemplary embodiments are described with reference to FIG. 14. In FIG. 14, a controller 1400 is described as representative of a computing device that implements the convolutional neural network of FIG. 5. The computing device includes a Central Processing Unit (CPU) 1401 which performs the processes described above/below. The process data and instructions may be stored in a memory 1402. These processes and instructions may also be stored on a storage medium disk 1404 such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a Random Access Memory (RAM), a Read-Only Memory (ROM), a Programmable Read-Only Memory (PROM), an Erasable Programmable Read-Only Memory (EPROM), an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 1401, a CPU 1403 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 1401 or the CPU 1403 may be a Xenon or a Core processor from Intel of America or an Opteron processor from Advanced Micro Devices (AMD) of America, or may be other processor types that would be recognized by one of ordinary skill in the art. Alternatively, the CPU 1401, the CPU 1403 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 1401, the CPU 1403 may be implemented as multiple processors cooperatively working in parallel to perform the instructions of the inventive processes described above.

The computing device in FIG. 14 also includes a network controller 1406, such as an Intel Ethernet Professional (PRO) network interface card from an Intel Corporation of America, for interfacing with a network 1460. As can be appreciated, the network 1460 can be a public network, such as the Internet, or a private network such as a Local Area Network (LAN) or a Wide Area Network (WAN), or any combination thereof and can also include a Public Switched Telephone Network (PSTN) or an Integrated Services Digital Network (ISDN) sub-networks. The network 1460 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 1408, such as a NVIDIA GeForce Giga Texel Shader eXtreme (GTX) or a Quadro graphics adaptor from a NVIDIA Corporation of America for interfacing with a display 1410, such as a Hewlett Packard HPL2445w Liquid Crystal Display (LCD) monitor. A general purpose I/O interface 1412 interfaces with a keyboard and/or mouse 1414 as well as a touch screen panel 1416 on or separate from display 1410. The general purpose I/O interface 1412 also connects to a variety of peripherals 1418 including printers and scanners, such as an OfficeJet or DeskJet from HP.

A sound controller 1420 is also provided in the computing device such as a Sound Blaster X-Fi Titanium from Creative, to interface with speakers/microphone 1422 thereby providing sounds and/or music.

A general-purpose storage controller 1424 connects the storage medium disk 1404 with a communication bus 1426, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 1410, keyboard and/or mouse 1414, as well as the display controller 1408, the general purpose storage controller 1424, the network controller 1406, the sound controller 1420, and the general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
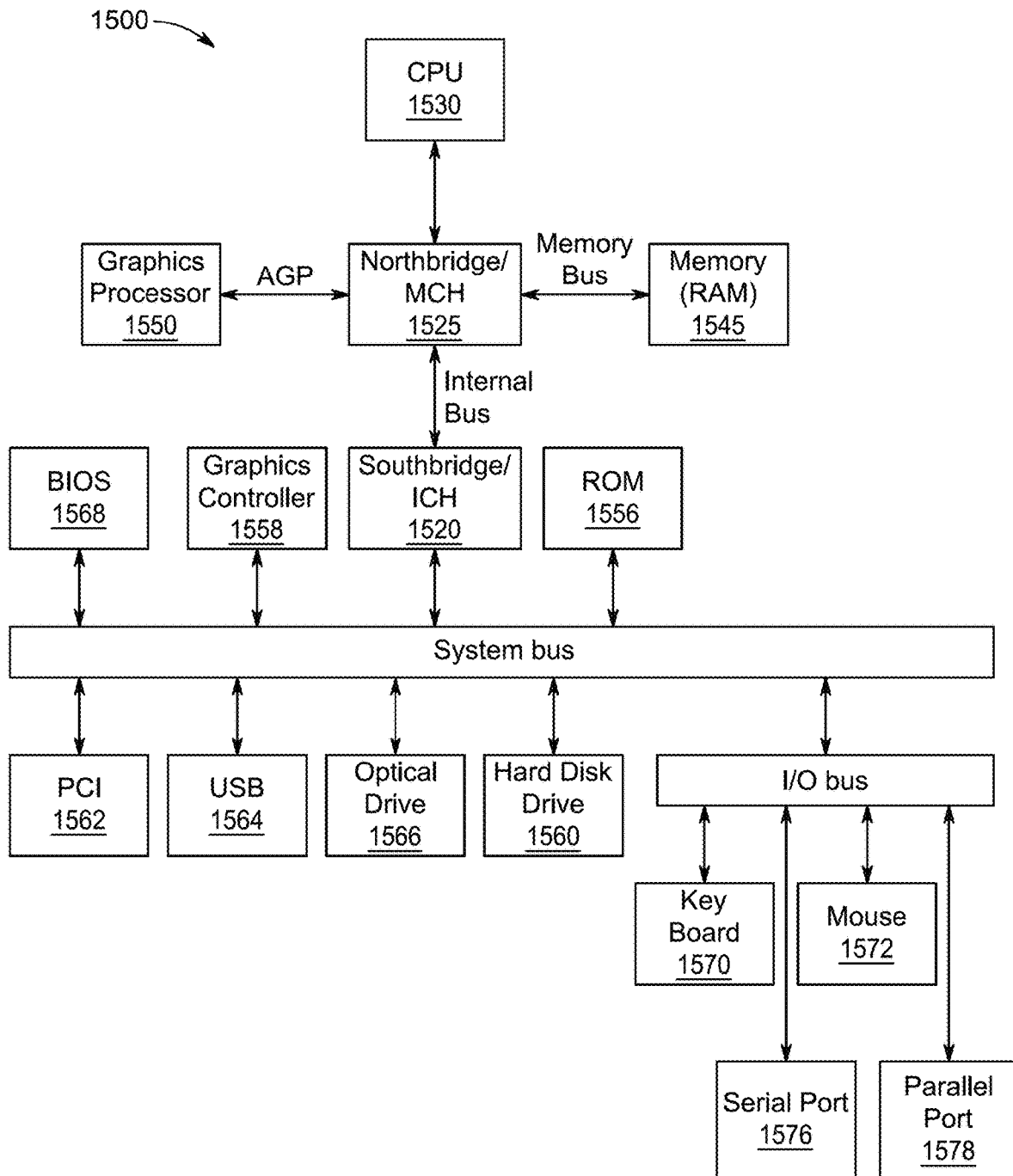
FIG. 15 is an exemplary schematic diagram of a data processing system used within the computing system, according to certain embodiments.

FIG. 15 shows a schematic diagram of a data processing system 1500, according to certain embodiments, for performing the functions of the exemplary embodiments. The data processing system 1500 is an example of a computer in which code or instructions implementing the processes of the illustrative embodiments may be located.

In FIG. 15, the data processing system 1500 employs a hub architecture including a North Bridge and a Memory Controller Hub (NB/MCH) 1525 and a south bridge and an Input/Output (I/O) Controller Hub (SB/ICH) 1520. The CPU 1530 is connected to the NB/MCH 1525. The NB/MCH 1525 also connects to a memory 1545 via a memory bus and connects to a graphics processor 1550 via an Accelerated Graphics Port (AGP). The NB/MCH 1525 also connects to the SB/ICH 1520 via an internal bus (e.g., a unified media interface or a direct media interface). The CPU 1530 may contain one or more processors and even may be implemented using one or more heterogeneous processor systems.

Figure 16:
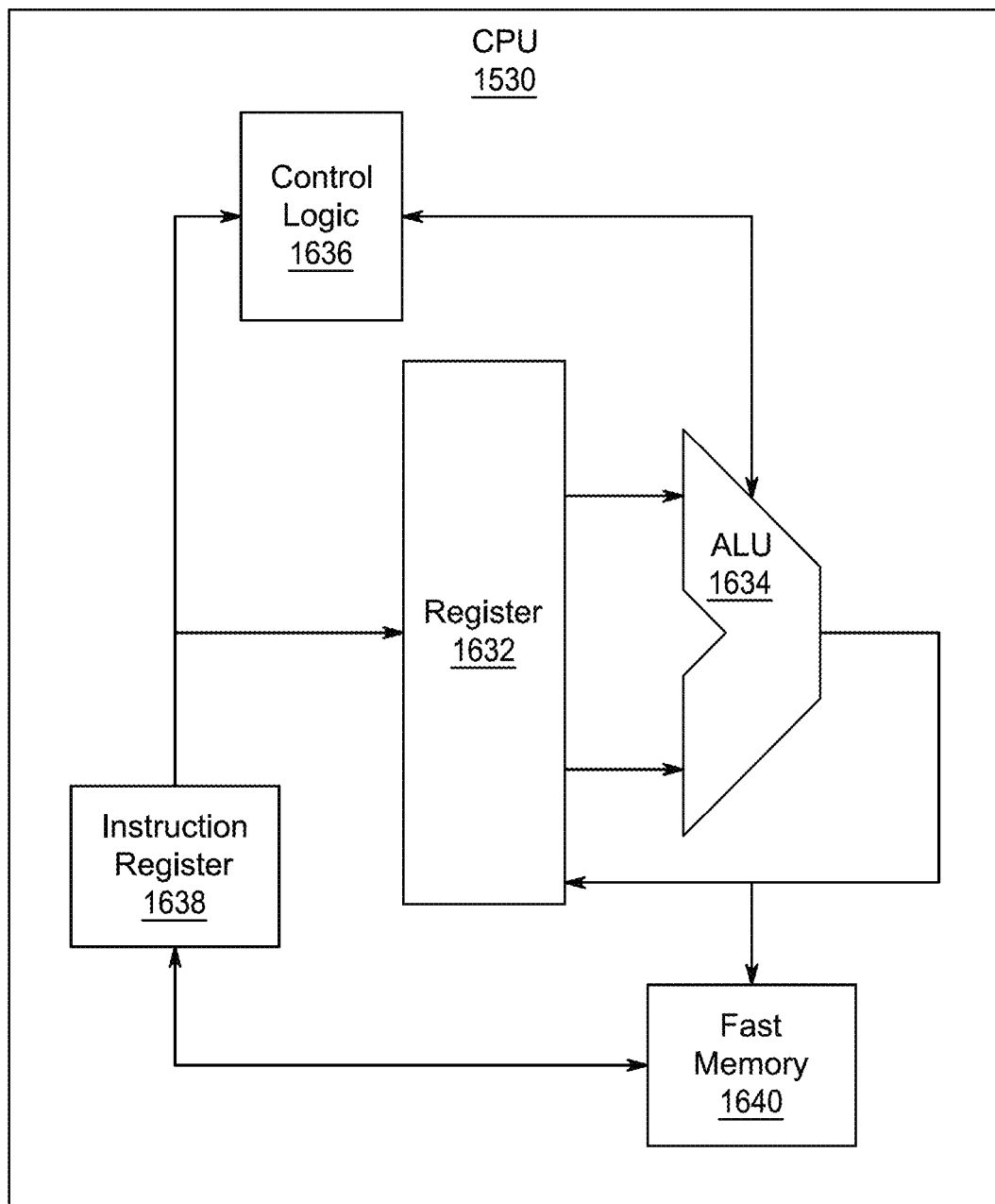
FIG. 16 is an exemplary schematic diagram of a processor used with the computing system, according to certain embodiments.

For example, FIG. 16 shows one implementation of the CPU 1530. In one implementation, an instruction register 1638 retrieves instructions from a fast memory 1640. At least part of these instructions is fetched from the instruction register 1638 by a control logic 1636 and interpreted according to the instruction set architecture of the CPU 1530. Part of the instructions can also be directed to a register 1632. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1634 that loads values from the register 1632 and performs logical and mathematical operations on the loaded values according to the instructions. The results from these operations can be feedback into the register 1632 and/or stored in the fast memory 1640. According to certain implementations, the instruction set architecture of the CPU 1530 can use a reduced instruction set architecture, a complex instruction set architecture, a vector processor architecture, and a very large instruction word architecture. Furthermore, the CPU 1530 can be based on a Von Neuman model or a Harvard model. The CPU 1530 can be a digital signal processor, a Field-Programmable Gate Array (FPGA), an Application-Specific Integrated Circuit (ASIC), a Programmable Logic Array (PLA), a Programmable Logic Device (PLD), or a Complex Programmable Logic Device (CPLD). Further, the CPU 1530 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 15, the data processing system 1500 can include that the SB/ICH 1520 is coupled through a system bus to an I/O Bus, a ROM 1556 a Universal Serial Bus (USB) port 1564, a flash Binary Input/Output System (BIOS) 1568, and a graphics controller 1558. Peripheral Component Interconnect/Peripheral Component Interconnect Express (PCI/PCIe) devices can also be coupled to SB/ICH 888 through a PCI bus 1562.

The PCI devices may include, for example, Ethernet adapters, add-in cards, and Personal Computer (PC) cards for notebook computers. The HDD 1560 and an optical drive 1566 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 1560 and the optical drive 1566 can also be coupled to the SB/ICH 1520 through a system bus. In one implementation, a keyboard 1570, a mouse 1572, a serial port 1576, and a parallel port 1578 can be connected to the system bus through the I/O bus. Other peripherals and devices that can be connected to the SB/ICH 1520 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 17:
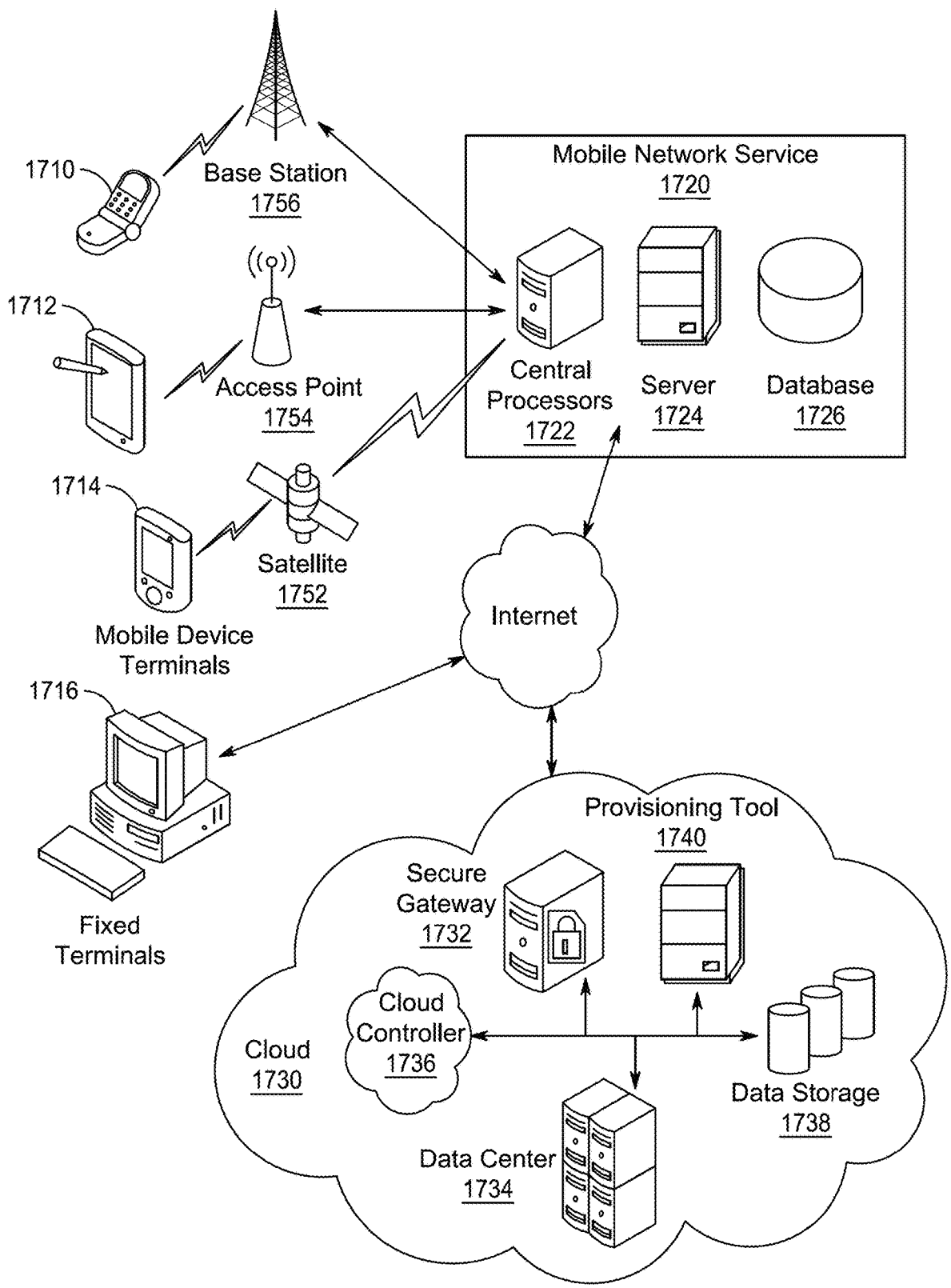
FIG. 17 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 17, in addition to various human interface and communication devices (e.g., display monitors, smart phones, tablets, personal digital assistants (PDAs)). More specifically, FIG. 17 illustrates client devices including a smart phone 1710, a tablet 1712, a mobile device terminal 1714 and fixed terminals 1716. These client devices may be commutatively coupled with a mobile network service 1720 via a base station 1756, an access point 1754, a satellite 1752 or via an internet connection. The mobile network service 1720 may comprise central processors 1722, a server 1724 and a database 1726. The fixed terminals 1716 and the mobile network service 1720 may be commutatively coupled via an internet connection to functions in cloud 1730 that may comprise a security gateway 1732, a data center 1734, a cloud controller 1736, a data storage 1738 and a provisioning tool 1740. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method for detecting defects in solar panels, comprising:
 collecting, by a thermal camera on at least one imaging drone navigating over at least one mounted and operational solar panel, an image dataset of infrared images of the at least one mounted and operational solar panel;
 applying the image dataset to a You Only Look One Series—Photovoltaic (YOLOS-PV) convolutional neural network including a pretrained vision transformer;
 converting, by the pretrained vision transformer, the image dataset to a set of patches representing defined portions of the image dataset;
 applying, by a sequential position embedder, position embedding to each patch of the set of patches and generating a set of position embedded patches;
 applying the set of position embedded patches to a transformer block encoder;
 generating, by the transformer block encoder, a set of detection tokens;
 applying the set of detection tokens to an array of multi-layer perceptron (MLP) heads;
 classifying, by the MLP heads, defects in the set of position embedded patches;
 setting, by the MLP heads, a plurality of Bpred bounding boxes for each of the set of position embedded patches; and
 identifying, by a computer system having circuitry with program instructions including the YOLOS-PV convolutional neural network, and at least one processor configured to execute the YOLOS-PV convolutional neural network, a solar panel in need of repair based on the defects in the set of position embedded patches and the plurality of Bpred bounding boxes, wherein the identifying includes calculating a weighted loss combination comprising a first weight of 0.750 applied to a generalized intersection over union (GIoU) loss and a second weight of 0.250 applied to an L1 regression loss for the plurality of Bpred bounding boxes.

2. The method of claim 1, further comprising:
 calculating, by the computer system, a set of coordinates $(x_i, y_i, w_i, h_i)$, $i=1, 2, \ldots N$ of each ith Bpred bounding box, where a coordinate $(x_i, y_i)$ denotes a center of an ith Bpred bounding box, and $(w_i, h_i)$ represents a width and a height of the ith Bpred bounding box; and
 calculating, by the computer system, an L1 loss between the set of coordinates of each ith Bpred bounding box and a set of ground-truth bounding box coordinates $(x_{i0}, y_{i0}, w_{i0}, h_{i0})$ stored in a memory of the computer system.

3. The method of claim 2, wherein the L1 loss for each ith Bpred bounding box is given by:

$$L1(i)=|x_i-x_{i0}|+|y_i-y_{i0}|+|w_i-w_{i0}|+|h_i-h_{i0}|.$$

4. The method of claim 3, further comprising:
 calculating a total L1 loss L_L1 for all N objects in the image dataset by calculating:

$$L\_L1=\Sigma L1(i), \text{where } i=1,\ldots,N.$$

5. The method of claim 1, wherein the GIoU loss is calculated as:

$$GIoU = (Bpred, Bgt) = IoU(Bpred, Bgt) - \left(\left(en\text{-box}(Bpred, Bgt) - (Bpred \cup Bgt)\right)/en\text{-box}(Bpred, Bgt)\right)$$

wherein, Bgt is a ground truth bounding box, IoU is an intersection over union, and en-box is an enclosing box containing both Bpred and Bgt bounding boxes.

6. The method of claim 1, wherein the weighted loss combination reduces overlapping Bpred bounding boxes for different object classes by assigning higher priority to the GIoU loss than to the L1 regression loss.

7. The method of claim 1, wherein the defects classified by the MLP heads include at least one of a hotspot, a crack, a broken glass, a soiled area, a corroded area, a delamination, a bubble, an induced degradation, and a diode defect.

8. A system for solar panel defect detection, comprising:
at least one imaging drone equipped with a thermal camera configured to collect infrared images of at least one mounted and operational solar panel;
a computer system having circuitry, memory storing program instructions, and at least one processor configured to:
receive an image dataset of infrared images from the at least one imaging drone;
process the image dataset using a YOLOS-PV convolutional neural network comprising a pretrained vision transformer;
convert the image dataset to a set of patches;
apply position embedding to each patch;
generate a set of detection tokens using a transformer block encoder;
classify defects and a plurality of Bpred bounding boxes for the defects using an array of multi-layer perceptron (MLP) heads; and
determine which solar panel needs repair based on a weighted loss combination comprising a first weight of 0.750 applied to a generalized intersection over union (GIoU) loss and a second weight of 0.250 applied to an L1 regression loss for the plurality of Bpred bounding boxes, and wherein the weighted loss combination resolves overlapping Bpred bounding boxes for different object classes.

9. The system of claim 8, wherein the GIoU loss accounts for non-overlapping bounding boxes by incorporating a penalty based on a size of an enclosing box containing both Bpred and Bgt bounding boxes.

10. The system of claim 8, wherein the determination of which solar panel needs repair includes calculating a total loss based on the weighted loss combination across all detected objects in the image dataset.

11. The system of claim 8, wherein the YOLOS-PV convolutional neural network is trained on a dataset of solar panel thermal images containing known defects with annotated bounding boxes.

12. The system of claim 8, wherein the weighted loss combination is calculated according to:

$$\text{Weighted\_Lbox}(bi, \hat{b}\sigma(i)) = \\ (0.750 \times \lambda GIoU \times GIoU(bi, \hat{b}\sigma(i)) + 0.250 \times \lambda L1 \times \|bi - \hat{b}\sigma(i)\|1) / \\ (0.750 + 0.250)$$

wherein bi denotes an ith ground-truth bounding box, $\hat{b}\sigma(i)$ denotes a prediction with a lowest cost from bi, $\lambda GIoU$ and $\lambda L1$ are scaling factors for respective loss components.

13. The system of claim 8, wherein the thermal camera captures temperature variations in the at least one mounted and operational solar panel to identify the defects that are not visible in regular optical images.

14. A non-transitory computer-readable medium storing instructions that, when executed by a processor, cause the processor to perform a method for detecting defects in solar panels, the method comprising:

receiving an image dataset of infrared images of at least one mounted and operational solar panel;
applying the image dataset to a YOLOS-PV convolutional neural network;
converting the image dataset to a set of patches;
applying position embedding to each patch;
generating a set of detection tokens;
classifying defects and a plurality Bpred bounding boxes for the defects;
calculating a generalized intersection over union (GIoU) loss between the plurality of Bpred bounding boxes and ground-truth bounding boxes, wherein the GIoU loss accounts for non-overlapping bounding boxes by incorporating a penalty based on a size of an enclosing box containing both Bpred and Bgt bounding boxes;
calculating an L1 regression loss between coordinates of the Bpred and Bgt bounding boxes;
applying a weighted loss combination of the GIoU loss and the L1 regression loss, wherein a weight of 0.750 is applied to the GIoU loss and a weight of 0.250 is applied to the L1 regression loss; and
determining which solar panel needs repair based on the classification and the weighted loss combination.

15. The non-transitory computer-readable medium of claim 14, wherein the weighted loss combination reduces overlapping Bpred bounding boxes for different defect types that are in close proximity to each other in the infrared images.

16. The non-transitory computer-readable medium of claim 14, wherein the method further comprises:
displaying the infrared images with the plurality of Bpred bounding boxes overlaid on the infrared images, wherein each Bpred bounding box is associated with a specific defect type.

17. The non-transitory computer-readable medium of claim 14, wherein the GIoU loss is calculated as:

$$GIoU(Bpred, Bgt) = IoU(Bpred, Bgt) - \\ ((en\text{-box}(Bpred, Bgt) - (Bpred \cup Bgt)) / en\text{-box}(Bpred, Bgt))$$

wherein Bgt is a ground truth bounding box, IoU is an intersection over union, and en-box is an enclosing box containing both the Bpred and Bgt bounding boxes.

18. The non-transitory computer-readable medium of claim 14, wherein the weighted loss combination improves mean average precision (mAP) for defect detection in the infrared images compared to unweighted loss combinations.

19. The non-transitory computer-readable medium of claim 14, wherein the weighted loss combination is optimized through experimentation over a range of epochs to determine weights of 0.750 for the GIoU loss and 0.250 for the L1 regression loss as optimal values for defect localization in the infrared images.

20. The non-transitory computer-readable medium of claim 14, wherein the GIoU loss provides a non-zero gradient for optimization even when there is no overlap between the Bpred and Bgt bounding boxes, thereby improving the YOLOS-PV convolutional neural network convergence during training.

* * * * *